United States Patent
Polycarpou et al.

(10) Patent No.: US 12,525,408 B2
(45) Date of Patent: Jan. 13, 2026

(54) STRUCTURAL ZINC-ION SUPERCAPACITORS (ZIHSCs)

(71) Applicant: The Texas A&M University System, College Station, TX (US)

(72) Inventors: Andreas A. Polycarpou, College Station, TX (US); Ahmad Amiri, College Station, TX (US)

(73) Assignee: The Texas A&M University System, College Station, TX (US)

( * ) Notice: Subject to any disclaimer, the term of this patent is extended or adjusted under 35 U.S.C. 154(b) by 96 days.

(21) Appl. No.: 18/695,767

(22) PCT Filed: Oct. 12, 2022

(86) PCT No.: PCT/US2022/046383
§ 371 (c)(1),
(2) Date: Mar. 26, 2024

(87) PCT Pub. No.: WO2023/091251
PCT Pub. Date: May 25, 2023

(65) Prior Publication Data
US 2024/0395472 A1 Nov. 28, 2024

Related U.S. Application Data

(60) Provisional application No. 63/256,414, filed on Oct. 15, 2021.

(51) Int. Cl.
*H01G 11/36* (2013.01)
*H01G 11/58* (2013.01)
*H01G 11/86* (2013.01)

(52) U.S. Cl.
CPC .............. *H01G 11/36* (2013.01); *H01G 11/58* (2013.01); *H01G 11/86* (2013.01)

(58) Field of Classification Search
None
See application file for complete search history.

(56) References Cited

U.S. PATENT DOCUMENTS

| | | | |
|---|---|---|---|
| 10,658,679 B2 * | 5/2020 | Lockett | H01M 4/38 |
| 2011/0255214 A1 * | 10/2011 | Gruner | H01G 11/46 |
| | | | 977/948 |

(Continued)

FOREIGN PATENT DOCUMENTS

| | | | | |
|---|---|---|---|---|
| CN | 112038110 A | * | 12/2020 | H01G 11/56 |
| CN | 118538545 A | * | 8/2024 | A61N 1/378 |

(Continued)

OTHER PUBLICATIONS

Machine Translation (Year: 2020).*

*Primary Examiner* — Dion R. Ferguson
(74) *Attorney, Agent, or Firm* — Jackson Walker LLP

(57) ABSTRACT

In an embodiment, the present disclosure pertains to a supercapacitor composed of a cathode material, a gel electrolyte, and a zinc foil anode. In some embodiments, the cathode material, the gel electrolyte, and the zinc foil anode are in a multilayered configuration. In some embodiments, the cathode and anode materials provide load-bearing capability. In an additional embodiment, the present disclosure pertains to a method of making a supercapacitor. In general, the method includes fabricating a cathode material, preparing a gel electrolyte, coating a zinc foil electrode with the gel electrolyte, and sandwiching the zinc foil electrode with the cathode material. In some embodiments, the sandwiching forms a multilayered configuration composed of the cathode material, the gel electrolyte, and the zinc foil anode. In some embodiments, the cathode and anode materials provide load-bearing capability that can include, without limitation, maximum tensile strength, Young's modulus, toughness, and combinations thereof.

20 Claims, 27 Drawing Sheets

(56) References Cited

U.S. PATENT DOCUMENTS

| | | | |
|---|---|---|---|
| 2021/0013551 A1* | 1/2021 | Zhi | H01M 10/38 |
| 2021/0104777 A1 | 4/2021 | Gaben et al. | |
| 2024/0395472 A1* | 11/2024 | Polycarpou | H01G 11/26 |
| 2025/0091452 A1* | 3/2025 | Thomas | H01G 11/62 |

FOREIGN PATENT DOCUMENTS

| | | | | |
|---|---|---|---|---|
| KR | 20210148641 A | * | 12/2021 | H01G 11/26 |
| WO | WO-2008124167 A1 | * | 10/2008 | H01M 4/663 |
| WO | WO-2010151227 A1 | * | 12/2010 | H01B 1/122 |
| WO | WO-2012034042 A2 | * | 3/2012 | H01M 8/02 |
| WO | WO-2020176162 A2 | * | 9/2020 | H01M 50/497 |
| WO | WO-2024177665 A2 | * | 8/2024 | H01M 4/625 |

\* cited by examiner

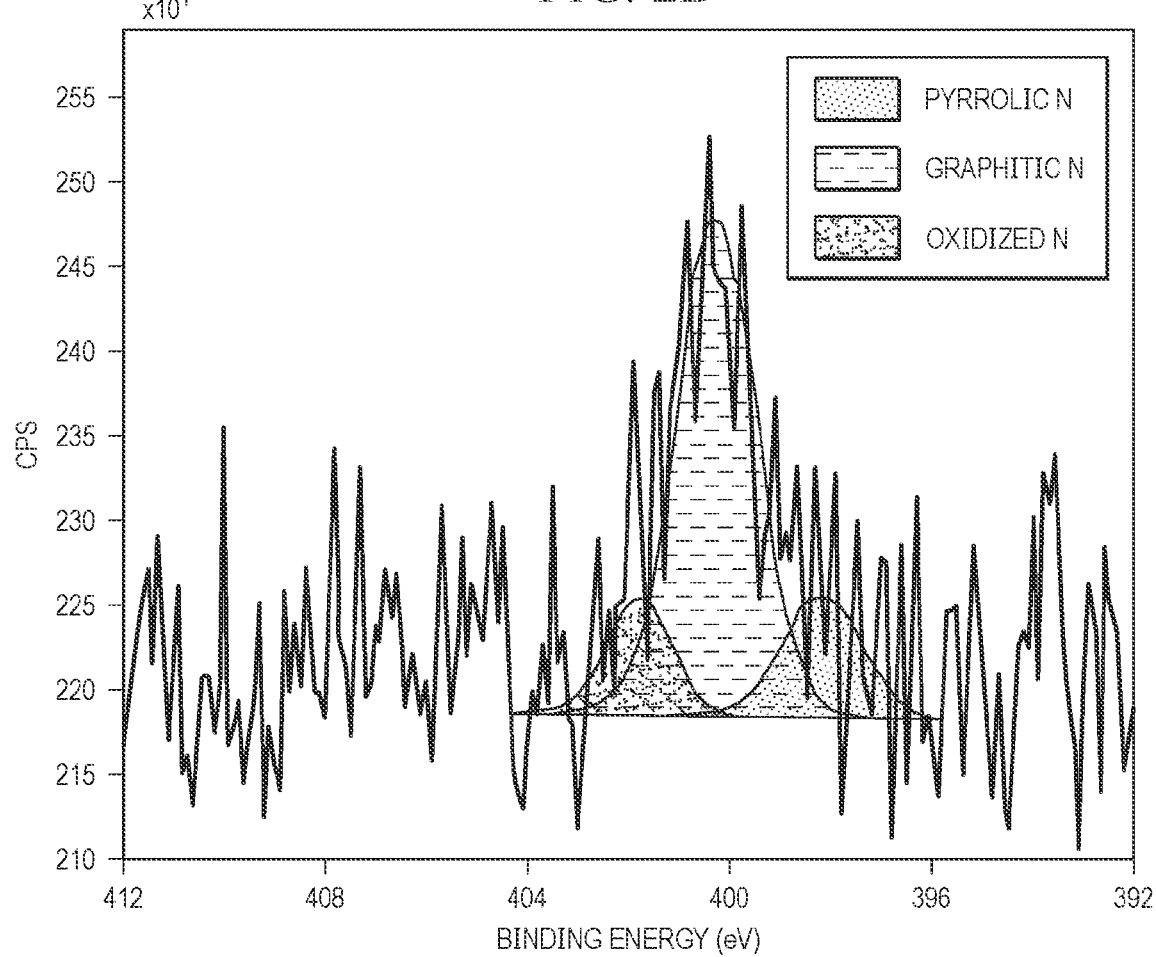

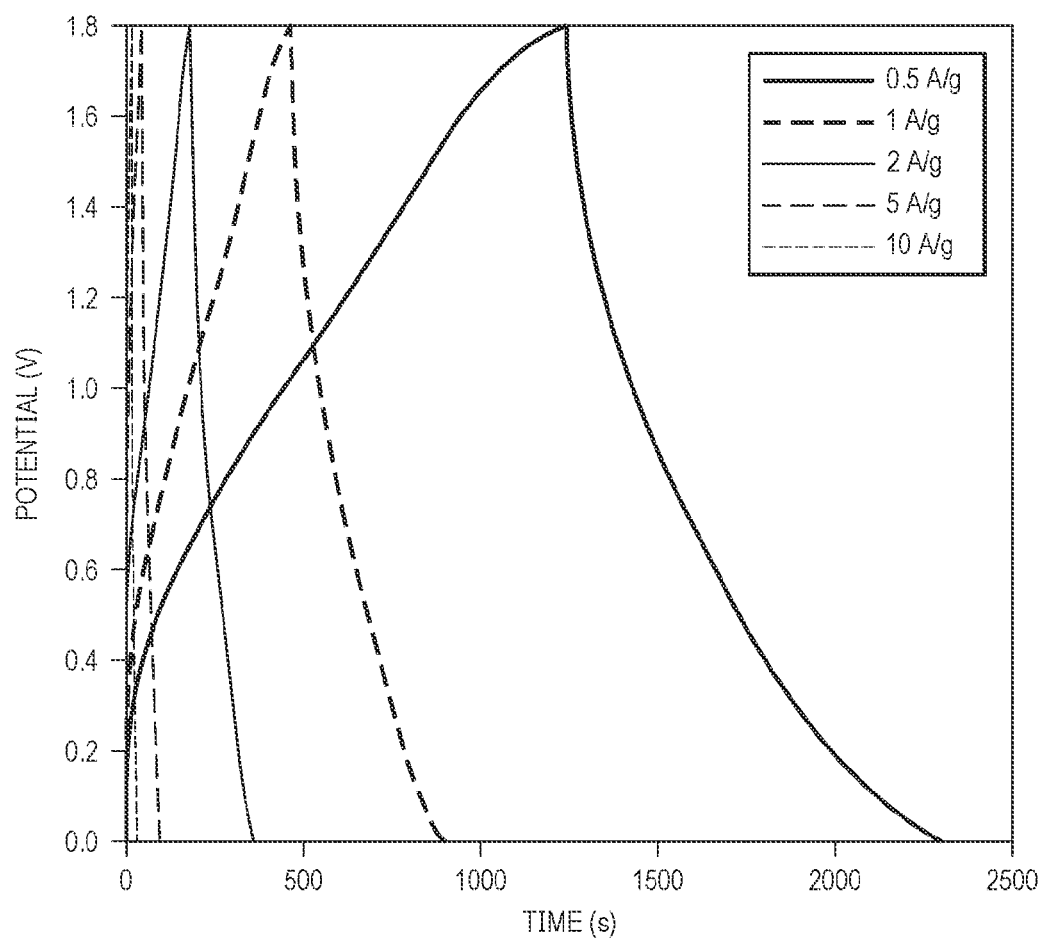

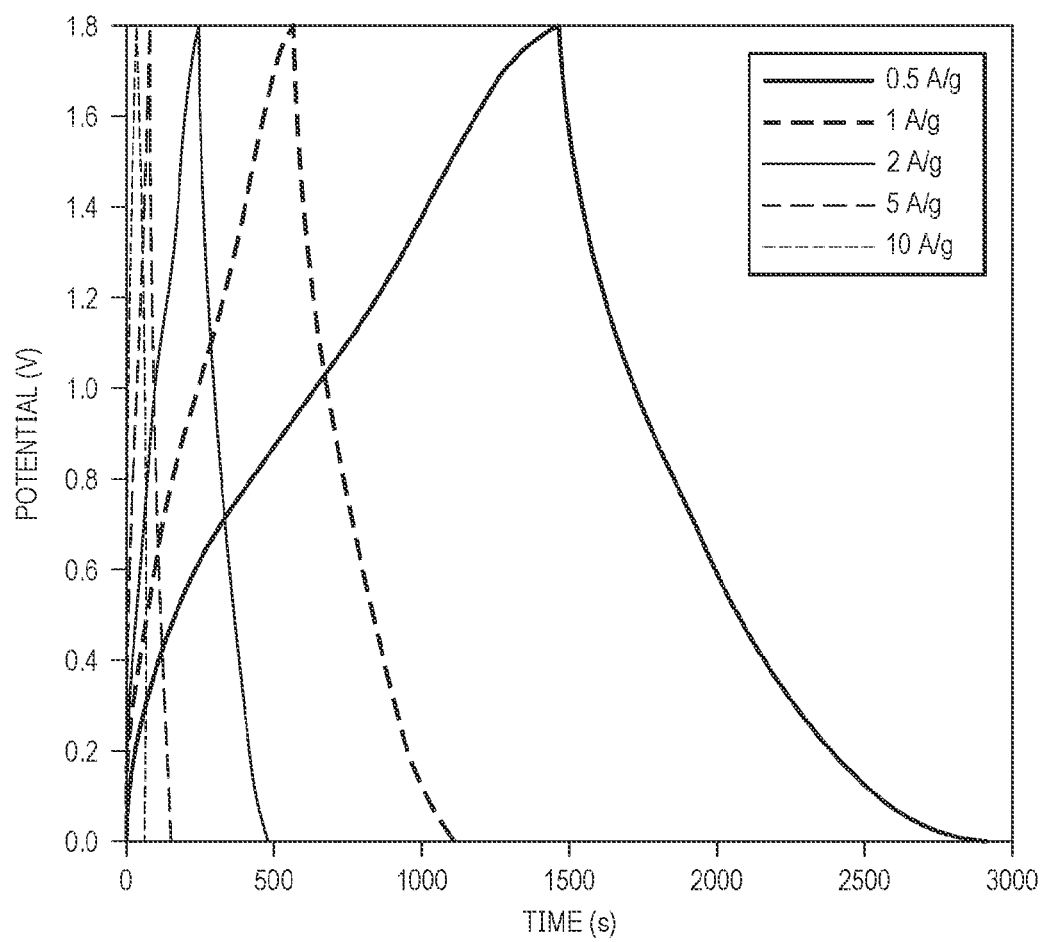

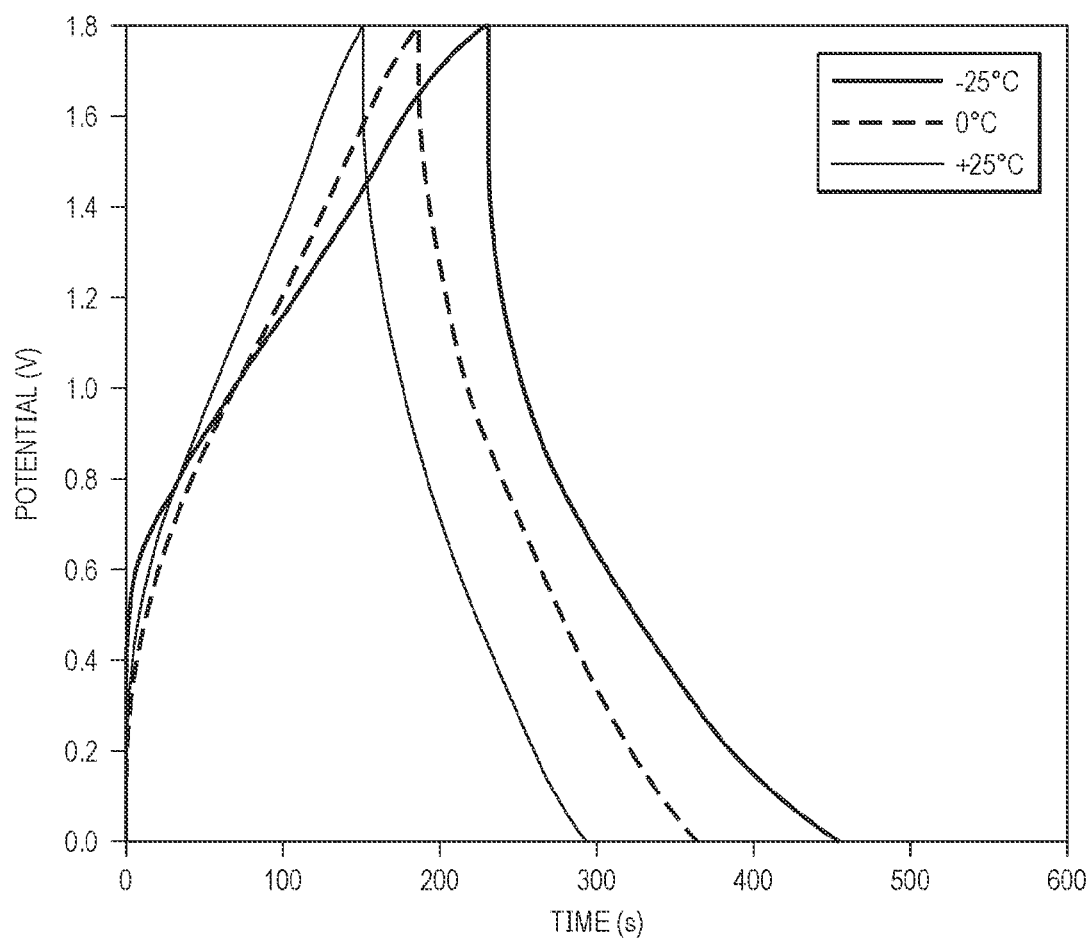

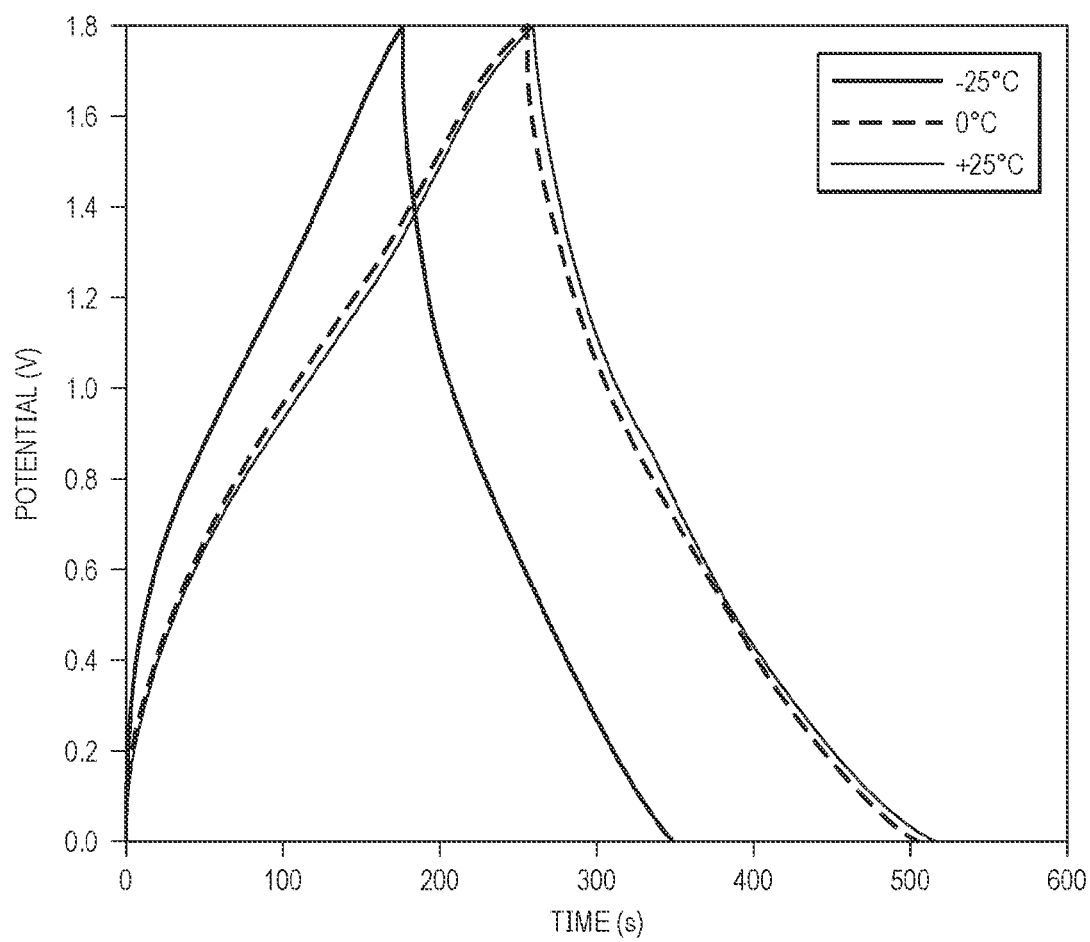

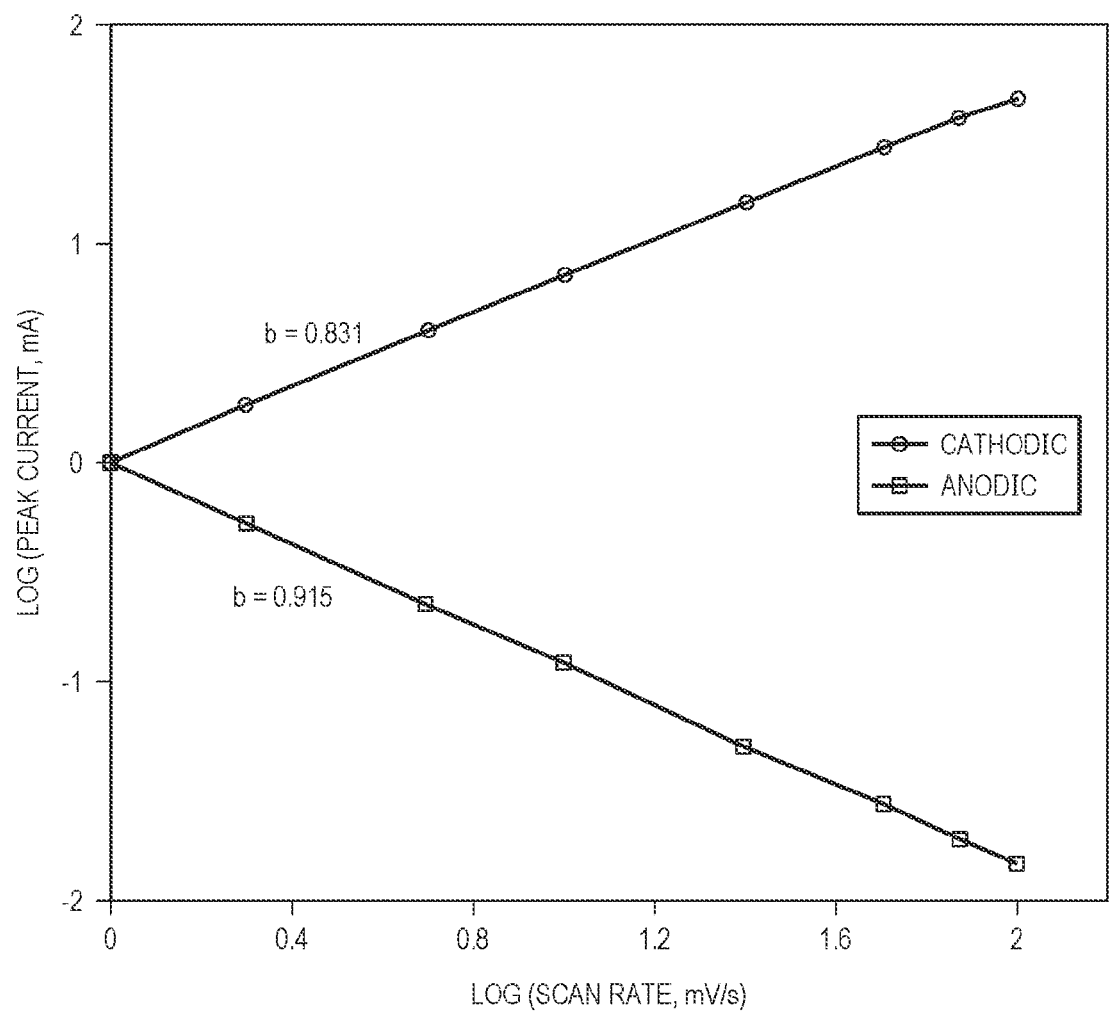

STRUCTURAL ZINC-ION SUPERCAPACITORS (ZIHSCs)

CROSS-REFERENCE TO RELATED APPLICATIONS

This patent application claims priority from, and incorporates by reference the entire disclosure of, U.S. Provisional Application No. 63/256,414 filed on Oct. 15, 2021.

TECHNICAL FIELD

The present disclosure relates generally to supercapacitors and more particularly, but not by way of limitation, to structural zinc-ion supercapacitors (ZIHSCs).

BACKGROUND

This section provides background information to facilitate a better understanding of the various aspects of the disclosure. It should be understood that the statements in this section of this document are to be read in this light, and not as admissions of prior art.

As energy consumption increasingly shifts toward renewable sources, it is becoming imperative that methods of energy storage are able to keep up with the demand. Specifically, some of the most common forms of renewable energy in solar and wind energy are reliant on natural factors that cannot be controlled, meaning that the need for energy storage on a large scale is more important now than ever before. Additionally, the growing significance of electric vehicles as well as portable electronic devices stresses the necessity of a cost-effective, environmentally-conscious method of energy storage and power delivery on a wide scale. Short life-time and low power densities of batteries and low energy density of supercapacitors (SCs) have been limited both types of energy storage. Structural energy storage devices offer both electrochemical and mechanical performance in a single multifunctional platform, making them promising alternatives for the next generation of weight- and/or volume-restricted applications, such as electric vehicles, aircraft, and satellites. However, the development of state-of-the-art multifunctional energy storage is predominately hindered by poor energy density.

A proposed replacement to batteries and SCs has been coined the hybrid SCs, which operate using one battery-type faradaic electrode and one capacitive electrode instead of two of the same kind. By combining the two forms of electrodes, hybrid SCs possess the same attractive qualities of SCs while offering a greater energy density than SCs. In these devices, the battery-type electrodes contribute a high energy capacity through ion insertion and extraction reactions, while the capacitor-type electrode allows for great power density through the process of rapid ion adsorption and desorption.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In an embodiment, the present disclosure pertains to a supercapacitor composed of a cathode material, a gel electrolyte, and a zinc foil anode. In some embodiments, the cathode material, the gel electrolyte, and the zinc foil anode are in a multilayered configuration. In some embodiments, the cathode and anode materials provide load-bearing capability.

In a further embodiment, the present disclosure pertains to a supercapacitor composed of a cathode material that can include, without limitation, unidirectional nitrogen-doped highly-porous carbon nanofibers (N-CNF), activated highly-porous CNF (A-CNF), and combinations thereof, a gel electrolyte including polyvinyl alcohol (PVA) therein, and a zinc foil anode. In some embodiments, the cathode material, the gel electrolyte, and the zinc foil anode are in a multi-layered configuration. In some embodiments, the cathode and anode materials provide load-bearing capability that can include, without limitation, maximum tensile strength, Young's modulus, toughness, and combinations thereof.

In an additional embodiment, the present disclosure pertains to a method of making a supercapacitor. In general, the method includes fabricating a cathode material, preparing a gel electrolyte, coating a zinc foil electrode with the gel electrolyte, and sandwiching the zinc foil electrode with the cathode material. In some embodiments, the sandwiching forms a multilayered configuration composed of the cathode material, the gel electrolyte, and the zinc foil anode. In some embodiments, the cathode and anode materials provide load-bearing capability that can include, without limitation, maximum tensile strength, Young's modulus, toughness, and combinations thereof.

BRIEF DESCRIPTION OF THE DRAWINGS

A more complete understanding of the subject matter of the present disclosure may be obtained by reference to the following Detailed Description when taken in conjunction with the accompanying Drawings wherein:

FIGS. 2D and 2F illustrate the N1s peak of A-CNF and N-CNF, respectively.

FIGS. 4A-4K illustrate: the galvanostatic charge-discharge (GCD) curves of (FIG. 4A) A-CNF cathode-included ZIHCSs and (FIG. 4B) N-CNF cathode-included ZIHCSs at different specific currents; the GCD curves of (FIG. 4C) A-CNF cathode-included ZIHCSs and (FIG. 4D) N-CNF cathode-included ZIHCSs at specific current of 2 A/g and different temperatures of −25° C., 0° C., and 25° C.; (FIG. 4E) specific capacitance vs. scan rate and (FIG. 4F) energy density vs. power density for A-CNF cathode- and N-CNF/ZIHSCs at different temperatures; (FIG. 4G) the capacitance retention of the N-CNF/ZIHSCs at 10 A/g—inset is the last 14 cycles at 10 A g$^{-1}$; (FIG. 4H) rate performances of the N-CNF/ZIHSCs at 0° C.; (FIG. 4I) areal capacitance vs. specific current of A-CNF and N-CNF at −25° C., 0° C., and 25° C.; (FIG. 4J) Ragone plots (areal energy density vs. areal power density) for A-CNF- and N-CNF-based ZIHSCs, graphene/carbon nanofiber (Gr/CNT), reduced graphene oxide/carbon nanotube (RGO/CNT), polyaniline nanowires (PA-NWs), graphene (Gr), onion-like carbon (OLC), activated carbon (AC), graphene/MnO$_2$ (Gr/MnO$_2$), and carbide-derived Carbon (CDC); (FIG. 4K) energy density-strength Ashby chart is developed to compare both load bearing and energy storing capabilities of the as-prepared ZIHSCs with the reported structural electrode materials in literature. The details of the collected data for plotting Ashby charts are provided in Table 2.

FIGS. 5A-5F illustrate: (FIG. 5A) Nyquist plots of the N-CNF/ZIHSCs; (FIG. 5B) cyclic voltammetry (CV) curves for N-CNF/ZIHSCs at various scan rates; (FIG. 5C) CV curves for N-CNF/ZIHSCs as a function of the voltage window; (FIG. 5D) cathodic and anodic b-values for N-CNF/ZIHSCs; (FIG. 5E) contributions of diffusion (outer area) and capacitive (inner area) mechanisms at 100 mV/s in energy storage; and (FIG. 5F) normalized contribution ratios of the capacitive (lower portion of columns) and diffusion-controlled (upper portion of columns) components at different scan rates.

DETAILED DESCRIPTION

Figure 1A:
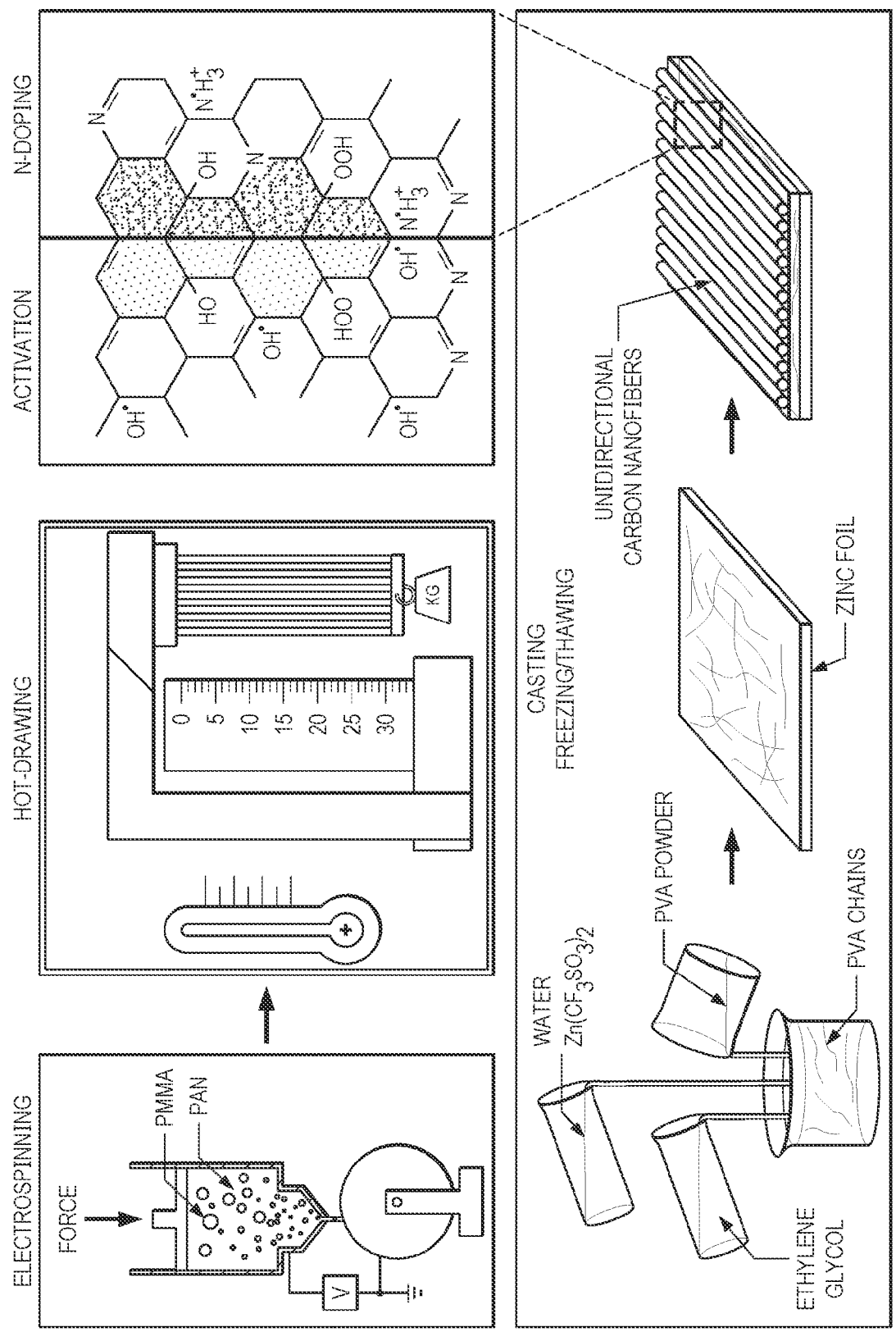
FIG. 1A illustrates a schematic showing the fabrication processes of cathode materials (P-CNFs, A-CNF and N-CNF—where CNF denotes carbon nanofibers—electrodes and their chemical skeletons after subjecting to activation and nitrogen doping processes) and solid-state electrolyte.

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

The recent exponential growth in the development and use of electric vehicles, portable electronics and wearable technologies has led to an ever-increasing demand for more efficient energy storage devices with high energy and power densities. There has been a recent push to develop energy storage materials which can also serve other functionalities as a means to attain weight and/or volume savings at the systems level. An example of such multifunctional material is the structural battery or supercapacitor (SC), which can both store energy and bear load simultaneously. This is useful for a wide range of volume- and weight-restricted applications, e.g., aerial and ground electric vehicles, electronics.

Among different categories of electrochemical energy storage devices, SCs with multilayered (laminated) structure show tremendous potential for utilization as structural energy storage devices. The layered structure of SCs, while required for energy storage, can also be used to develop reinforced materials, suitable for load bearing. When compared to battery storage, the energy in SCs is primarily stored through formation of electrical double layers (EDL) at the electrode-electrolyte interface, with insignificant ion diffusion into the electrode. Hence, as compared to batteries, the localization of energy storage to the interface is expected to lead to much less strength-compromising internal stress during charging and discharging.

Efforts to develop multifunctional materials inevitably introduce tradeoffs between functionalities, stemming from the specific dependence of each functionality on material microstructure. In particular for structural SCs, electrochemical properties (capacitance, energy density, specific power) are highly dependent on the specific surface area (SSA) of the electrodes. Formation of pores provides the electrodes with high surface area, but undoubtedly diminishes the mechanical attributes through generation of stress concentrations. This rather intrinsic trade-off between mechanical and electrochemical properties has been reported in recent studies on both structural SCs and batteries. Hence, developing a multifunctional hybrid material with a good balance between electrochemical and mechanical properties has remained a challenge.

Different carbon-based nanostructures, doped structures, and conductive polymers with excellent mechanical properties and reasonable electrochemical properties have been recently used to fabricate structural SCs. Graphene, carbon nanotubes (CNTs), aramid nanofiber (ANFs), Kevlar fiber, and carbon fiber-based electrodes are some example materials used to overcome the structural-electrochemical tradeoff. Some of these efforts achieved excellent mechanical properties, good capacitance, and long lifetime. However, the energy density of such structural capacitors and SCs is still far behind the demanding values for practical applications. In a recent effort, relying on both pseudocapacitance and double layer energy storing mechanisms in the presence of a cobalt-decorated nitrogen doped carbon fiber yarn cathode, an energy density of 45.4 Wh/kg was achieved, which outperforms previously-reported structural electrode materials, but is still far behind conventional batteries.

Ion-hybrid SCs including a battery-type electrode have been recently proposed to address this drawback. Of those, zinc (Zn)-ion hybrid supercapacitors (ZIHSCs) have attracted attention for their favorable electrochemical properties such as excellent volumetric specific capacitance of 5,855 mAh/cm$^3$, gravimetric specific capacity of 823 mAh/g, low redox potential (−0.76 V), remarkable environmental and electrochemical stability, as well as cost effectiveness, environmental friendliness and natural abundance. Traditional univalent hybrid SCs in which ions such as Li$^+$, Na$^+$, and K$^+$ act as charge carriers may not be an optimal solution, because these alkaline metals are highly reactive and can react violently with organic electrolytes commonly used in conjunction. In addition, univalent hybrid SCs are generally difficult and expensive to fabricate, making them an unappealing method of energy storage. However, when multivalent ion-type electrodes are used instead of univalent, several of these issues are resolved. Specifically, ions such as Zn$^{2+}$, Mg$^{2+}$, Ca$^{2+}$, and Al$^{3+}$ can be used to provide faster charge transfer dynamics, higher capacitance, and a higher energy density. Particular interest has been paid to zinc-ion hybrid supercapacitors (ZIHSCs) because of the positive attributes of multivalent ion hybrid SCs in addition to zinc's relative abundance, low cost, improved performance, safety, and low environmental impact. One of the promising hybrid SCs is the ZIHSC, which solves most of the issues faced by batteries and SCs.

Different electric double-layer SC-type cathode materials such as activated carbons, N-doped hierarchically porous carbon, reduced graphene oxide/carbon nanotubes, multifunctional mesoporous carbon hollow spheres, layered B/N co-doped porous carbon, functionalized carbon nanosponges, and other carbon-based cathodes were employed to fabricate efficient ZIHSCs with high energy density. An energy density range of 50-250 Wh/kg was reported for ZIHSCs so far, which is comparable to the most efficient Li-ion batteries. Beyond these properties, a metallic Zn anode material can simultaneously be used as a ductile load bearing element and current collector.

To maximize the overall efficiency of structural ZIHSCs, a cathode material with outstanding mechanical and electrochemical properties is required as well. One way to achieve the ideal mechanical attributes is to employ continuous reinforcement, such as carbon nanofibers (CNFs). To improve the electrochemical properties of CNFs, various techniques such as doping, activation, and metal oxide decoration have been used; capacitance up to 200 F/g has been reported. Although individual CNFs have an outstanding strength and modulus, the mechanical properties of (ribbon) bundles of electrospun fibers are still far from ideal.

Zinc-ion hybrid supercapacitors (ZIHSCs) have energy densities close to lithium-ion batteries, are low cost, highly safe, and viable energy storage devices to address all the requirements of this ever-growing demand. The present disclosure takes advantage of the beneficial properties of a metallic zinc anode, hot-drawn, highly-porous nitrogen-doped carbon nanofibers cathode, and poly(vinyl alcohol)/zinc/ethylene glycol gel electrolyte to fabricate the first freeze-resistant, structural ZIHSCs. As discussed in further detail below, the as-prepared structural ZIHSCs offer a battery-level gravimetric energy density of 80.2 Wh kg$^{-1}$ and outstanding areal energy density of 600 mF/cm$^2$, which is almost twice the value reported for the most efficient structural supercapacitors to date. The ZIHSC also presents cycling stability over 7,500 cycles, excellent mechanical properties (strength of 308 MPa, young modulus of 14.40 GPa, and toughness of 1.82 MJ/m$^3$), and useful performance at cryogenic conditions. Considering all relevant properties (load bearing and energy storage functionalities), the as-prepared ZIHSCs convincingly outperform state-of-the-art structural electrode materials.

In terms of energy storage mechanisms, the ZIHSCs can be classified into two main subclasses: the first subclass is composed of a battery-type anode such as zinc (Zn) or modified metal zinc and a capacitor-type cathode such as porous carbon-based materials or pseudocapacitive materials. The second subclass includes a capacitor-type anode such as porous carbon-based materials or pseudocapacitive materials and a battery-type cathode such as manganese- or vanadium-based oxides. Ion's adsorption/desorption and/or intercalation/deintercalation are the main energy storage mechanism in the capacitor-type electrodes. The energy storage mechanism for the battery-type electrodes is different for each subclass.

The deposition/stripping of Zn ions commonly occurs on the first subclass anode. In the charging process, anions transfer from the electrolyte to the cathode for absorbing on the surface, which is led to the formation of an electric double layer energy storage. The intercalation of anions is also possible through faradaic intercalation. On the other hand, the Zn$^{2+}$ ions in the Zn-based electrolyte move to the Zn anode and subsequently get deposited. The inverse procedure takes place in the discharge process, which composes of the diffusion back of the ions into the electrolyte.

The second subclass takes advantage of the insertion/extraction reaction of Zn ions on the cathode. In this subclass, the charging process begins with the movement of the Zn ions from battery-type cathode to electrolyte and subsequent adsorption onto/intercalation into the capacitor-type anode. The reverse process including desorption/deintercalation of the Zn ions and insertion into the battery-type cathode drives the discharging process.

While roadblocks have been encountered in the form of dendritic formations of zinc in alkaline electrolytes, slow reaction kinetics, potential unstable electrochemical behavior of the zinc anode, and metallic zinc's oxidation when exposed to air, the technology is innovative and research is being conducted to determine conditions that mitigate these possible drawbacks. Herein, we provided a comprehensive study for understanding the electrode material optimization related to ZIHSCs. Furthermore, mechanisms associated with storing energy in ZIHSCs are evaluated. Then, the proposed development and challenges associated with each, as well as viewpoints regarding fabrication of ZIHSCs with high electrochemical efficiency are discussed.

Working Examples

Reference will now be made to more specific embodiments of the present disclosure and data that provides support for such embodiments. However, it should be noted that the disclosure below is for illustrative purposes only and is not intended to limit the scope of the claimed subject matter in any way.

To address the need for multifunctional energy storage devices, several novel approaches to fabricate a structural ZIHSC with excellent mechanical properties, outstanding areal and gravimetric energy densities, and long lifetime were employed. The fabricated ZIHSC outperforms reported structural energy storage devices in terms of energy density as well as material indices including tensile strength×energy density and toughness×energy density. The ZIHSC was fabricated as follows: Unidirectional nitrogen-doped highly-porous carbon nanofibers (N-CNF) and activated highly-porous CNF (A-CNF) were fabricated via hot-drawing the electrospun polyacrylonitrile:polymethyl methacrylate (PAN:PMMA) precursors at a temperature above the glass transition temperature (hot-drawing). Activation treatment was performed using a 4.0 M KOH solution to increase the surface area and N-doping to improve electrical conductivity and wettability. The turbostratic alignment obtained after subjecting to hot-drawing step can significantly enhance the strength of CNFs, resulting in a dramatic rise in the contribution of cathode material (CNF) in load bearing.

Figure 1B:
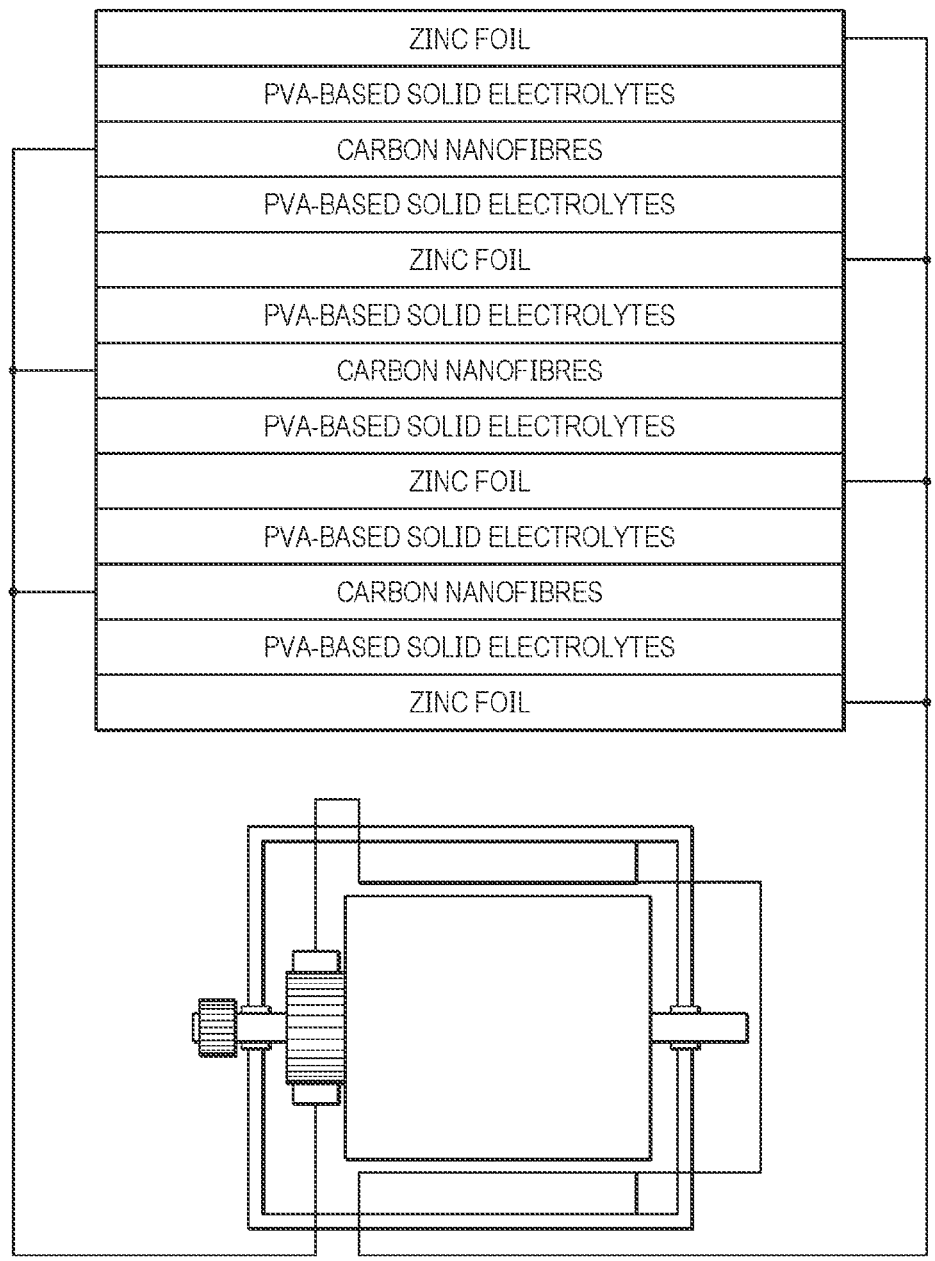
FIG. 1B illustrates a schematic of multilayered zinc-ion supercapacitors (ZIHSC) coupled to an electric motor.

In terms of electrochemical performance, the porous structure of free-standing N-CNF and A-CNF cathode materials provides large electrode/electrolyte interfaces to reduce the transport length of zinc ions, and serve as reservoirs for storage of zinc ion clusters. In addition, to make the ZIHSC applicable in different climate conditions, antifreezing properties are added to the structural ZIHSCs by using an antifreezing hydrogel as electrolyte and separator. The electrochemical and mechanical properties of this ZIHSC device were investigated at three temperatures of −25° C., 0° C., and +25° C. The mechanically-robust and tough ZIHSCs fabricated herein show ultra-high areal and gravimetric energy densities, and long-term electrochemical stability at different temperatures. Therefore, this disclosure addresses the need for mechanically-robust materials for multifunctional energy storage, which is applicable in a broad range of temperatures and applications. FIG. 1A shows the fabrication processes for the cathode and antifreezing electrolyte. Additionally, FIG. 1B illustrates a schematic of multilayered ZIHSCs coupled to an electric motor.

Morphology and structure of highly-porous, aligned A-CNFs and N-CNFs cathode materials. As described in detail previously, the interior micro-sized pores left after decomposition of sacrificial polymeric phase (PMMA) and activation cause formation of nano-sized pores. AFM images were employed to trace the surface morphology changes of the fibers at high resolution after activation and N-doping processes. In agreement with earlier works, there is a noticeable increase in the number of surface pores caused by KOH activation. N-doping can intensify this phenomenon by enlarging the pores and initiating new defects. The comparison of 3D AFM images clearly reveals that the nano-sized near-circular pores on the surface enlarge from the order of 10-50 nm in average diameter for A-CNF to 15-70 nm in the case of N-CNF. Also, the surface topographies of A-CNF and N-CNF show irregular ridges with depths and lengths of a few nanometers, which may contribute to increasing the surface area.

The mesopores on the cross-section of A-CNFs and N-CNFs are most likely generated as a result of the decomposition of noncontinuous phase (PMMA) in the emulsion during the carbonization process. This peculiar microstructure which mostly consists of interconnected holes with thin walls shortens the ion transfer length, provides numerous electron transfer channels, and may even improve the stiffness per unit weight (especially compared to the case of fully non-interconnected pores) by initiating specific microscopic shape factor. The irregular shape present in pore formation (inhomogeneous microstructure) is due to inhomogeneous etching during the activation process.

Low-magnified FESEM images of A-CNF and N-CNF show a near-perfect alignment of the fibers with the hot-drawing direction (2.5×). According to literature, the hot drawing process can improve the molecular orientation, resulting in better mechanical properties by graphitic/chain alignment of the continuous phase (PAN).

The EDS element mapping revealed the uniform distribution of carbon and oxygen in A-CNFs. The high percentage of oxygen content (17.6%) in A-CNF compared to only ~6% in the pristine sample is attributed to the grafting of miscellaneous oxygen-containing functional groups during activation. The list of reactions and possible products after KOH activation are provided in Table 1.

TABLE 1

Reaction between KOH and Carbon at different temperatures

| Reaction | Temperature (° C.) |
| --- | --- |
| $6KOH + 2C$ (in CNFs) → $2K + 3H_2 + 2K_2CO_3$ | 400-600 |
| $K_2CO_3 → K_2O + CO_2$ | >700 |
| $CO_2 + C$ (in CNFs) → $2CO$ | >700 |
| $K_2CO_3 + 2C → 2K + 3CO$ | >700 |
| $C + K_2O → 2K + CO$ | >700 |

Figure 2A:
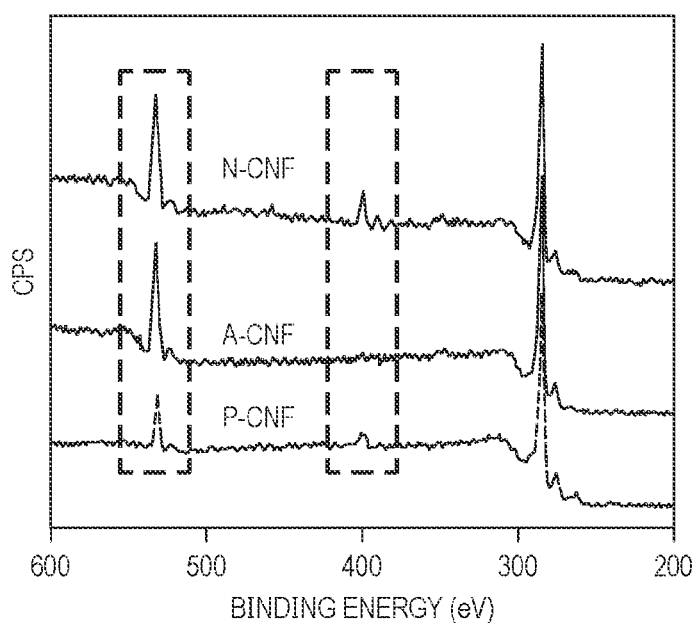
FIG. 2A illustrates X-ray photoelectron spectroscopy (XPS) survey spectra of pristine CNFs (P-CNFs), A-CNF and N-CNF.
Figure 2B:
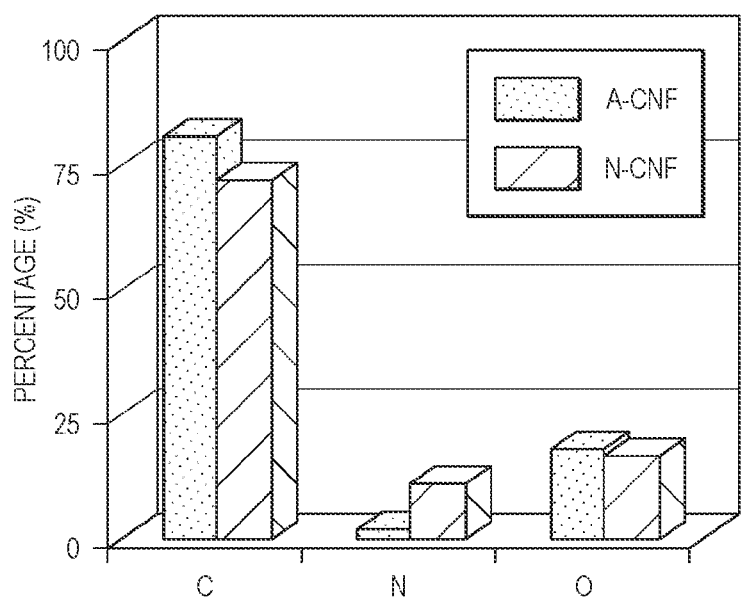
FIG. 2B illustrates the elemental composition of the A-CNF and N-CNF.

Nitrogen element was insignificant (1.6%) in A-CNFs. In contrast, the concentration of nitrogen element was increased significantly after doping to 11.3%, suggesting that nitrogen was homogeneously doped onto the carbonaceous structure of the fibers. To trace the configuration of dopants, elemental analysis of A-CNF and N-CNF was performed by X-ray photoelectron spectroscopy (XPS). The results in FIG. 2A and FIG. 2B are in line with the EDS mapping results, pointing to high concentration of oxygen in both A-CNF and N-CNF as well as high nitrogen-content in the case of N-CNF. As shown in FIG. 2A, while the survey scan of P-CNF and A-CNF includes strong C 1s, O 1s, and a weak N 1s peak, the N-CNF demonstrated a fairly sharp N-peak.

FIG. 2B presents the chemical composition of A-CNFs and N-CNFs. Following the N-doping procedure, the oxygen content dropped insignificantly from 17.6% in the A-CNF to 16.5% in the N-CNF. On the other hand, the N-content increased dramatically from 1.6% in the A-CNF to 11.3% in the N-CNF. All the nitrogen configurations experienced a sharp increase after the N-doping process (Pyridinic N: A-CNG~0 N-content×bond percentage, N-CNF ~1.6 N-content×bond percentage; Pyrrolic N: A-CNG~0.4 N-content×bond percentage, N-CNF~2.5 N-content×bond percentage; Graphitic N: A-CNG~1.2 N-content×bond percentage, N-CNF~4.8 N-content×bond percentage; Oxidized N: A-CNG~0.3 N-content×bond percentage, N-CNF~2.6 N-content×bond percentage. The high-resolution C is XPS spectra for both A-CNF and N-CNF samples (FIG. 2C and FIG. 2D, respectively) were deconvoluted with four common peaks at~284.7 eV, 286.2 eV, 287.5 eV, and 289.6 eV, representing the C=C/C—C, C—O/C=N, C—N/C=O, and COO signals, respectively. After N-doping (FIG. 2E), the intensity of C—N/C=O peak increased, which is in good agreement with the initiation of pyrrolic bonds. While the O1s spectra show no distinguishable change after N-doping, the comparison of N is XPS spectra for the A-CNF and N-CNF shows (i) significant improvement in the intensity of peaks associated with different N-configurations and (ii) the addition of a new configuration of N bonds (pyridinic N) at 397 eV. The changes in N-configurations after the N-doping procedure confirms N-doping. The N-doping procedure consists of melamine decomposition at T>235° C. in a furnace to generate $C(NH_2)_2$=N=N and $NH_2$—C=N compounds, followed by subsequent polymerization to $C_3N_4$ layers at T>400° C. Upon being subjected to T>700° C., the $C_3N_4$ polymer decomposes into active nitrogen-containing species such as $C_2N_2^+$, $C_3N_2^+$, $C_3N_3^+$, which are rich nitrogen sources for bonding with the reduced A-CNFs. The resulting material is N-doped samples with different N configurations.

Figure 3A:
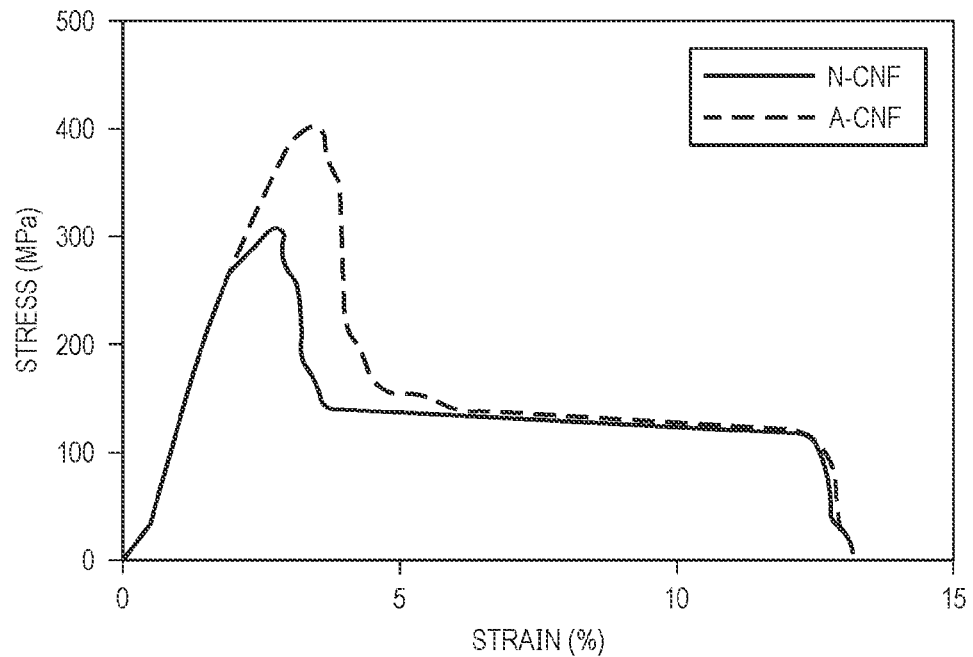
FIG. 3A illustrates typical stress-strain plots and FIG. 3B illustrates mechanical properties (averaged strength, Young's modulus and toughness) of A-CNF/ZIHSC and N-CNF/ZIHSC.

Mechanical Characterization of ZIHSCs. The geometry of the tensile specimens for mechanical tests has been chosen based on D3039/D3039M-17. The mechanical properties of the assembled ZIHSCs were studied and the results are provided in FIG. 3A. These laminated ZIHSCs have strength, Young's modulus, and toughness values of respectively greater than 300 MPa, 14 GPa, and 1.8 MJ/m$^3$ which are on par with conventional load bearing materials, such as automotive composites. The high strength and Young's modulus of the laminated ZIHSCs are due to the CNF cathode material, while the high toughness is due to the zinc foil anode. These results are promising for the mechanically-robust design of multifunctional energy storage systems.

Figure 3B:
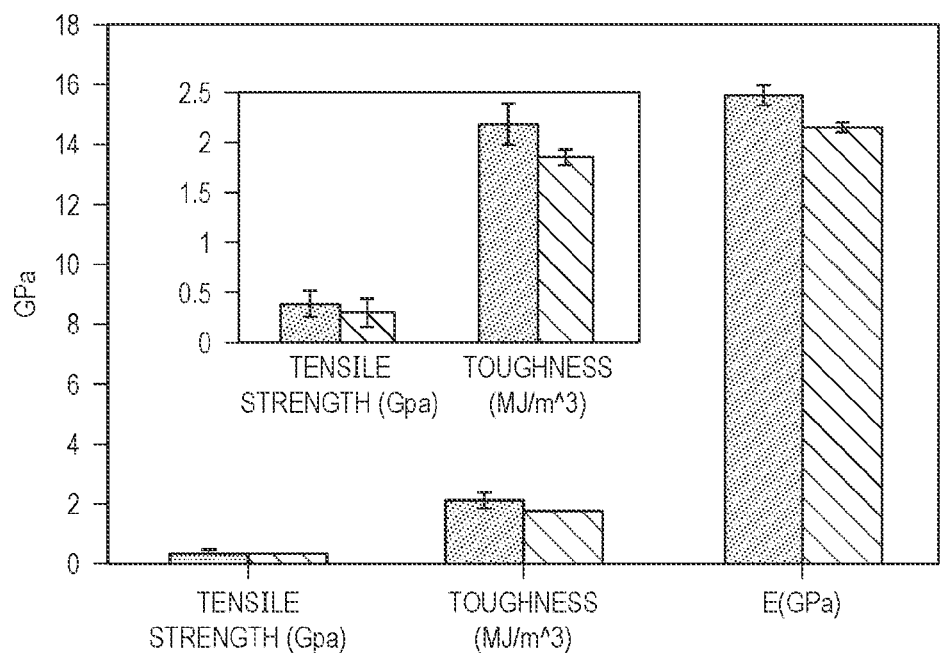

The tensile strength, Young's modulus, and toughness decreased after N-doping, as shown in FIG. 3B. The tensile strength, average Young's modulus, and toughness were reduced from 402.2±40.2 MPa, 15.45±4.6 GPa, and 2.18±0.44 MJ/m$^3$ in the case of the A-CNF/ZIHSCs to 308.3±30.8 MPa, 14.40±2.9 GPa, and 1.82±0.18 MJ/m$^3$ in the case of the N-CNF/ZIHSCs, respectively (FIG. 3B). These drops in mechanical properties are attributed to the enlargement of the pores and/or the debonding of C-N bonds in the loading direction. However, the obtained toughness for ZIHSCs is noticeably greater than recently-manufactured structural energy storage materials. A small sample of N-CNF/ZIHSCs were loaded with a 2 kg weight and exhibited excellent performance (~100 MPa).

Figure 3C:
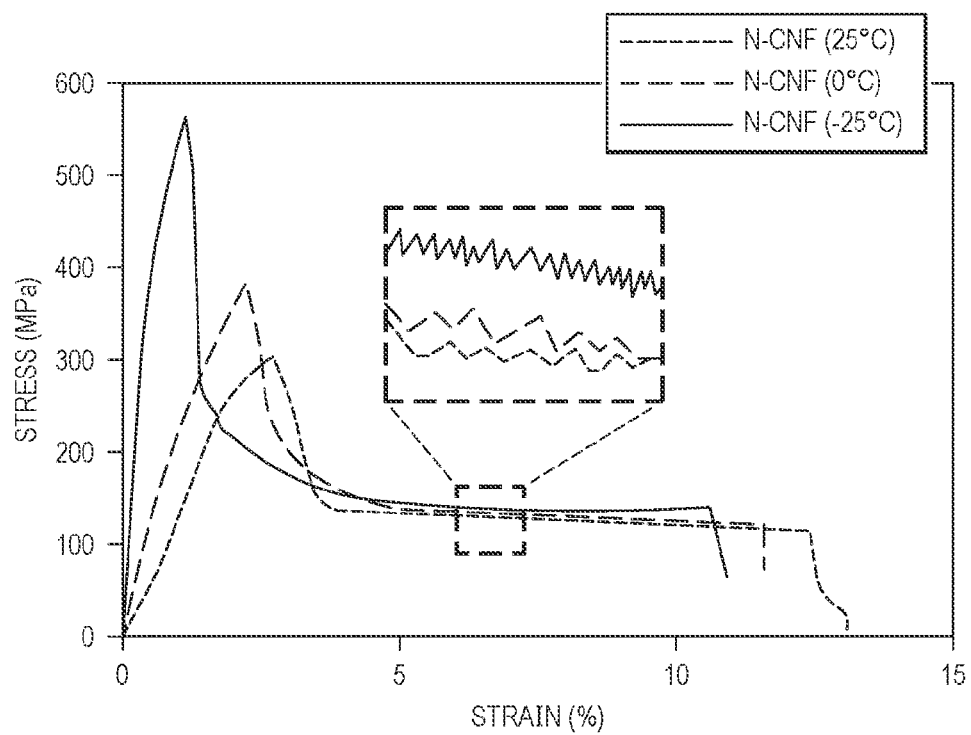
FIG. 3C illustrates typical stress-strain plots and FIG. 3D illustrates mechanical properties (averaged strength, Young's modulus and toughness) of N-CNF/ZIHSC at −25° C., 0° C., +25° C.
Figure 3D:
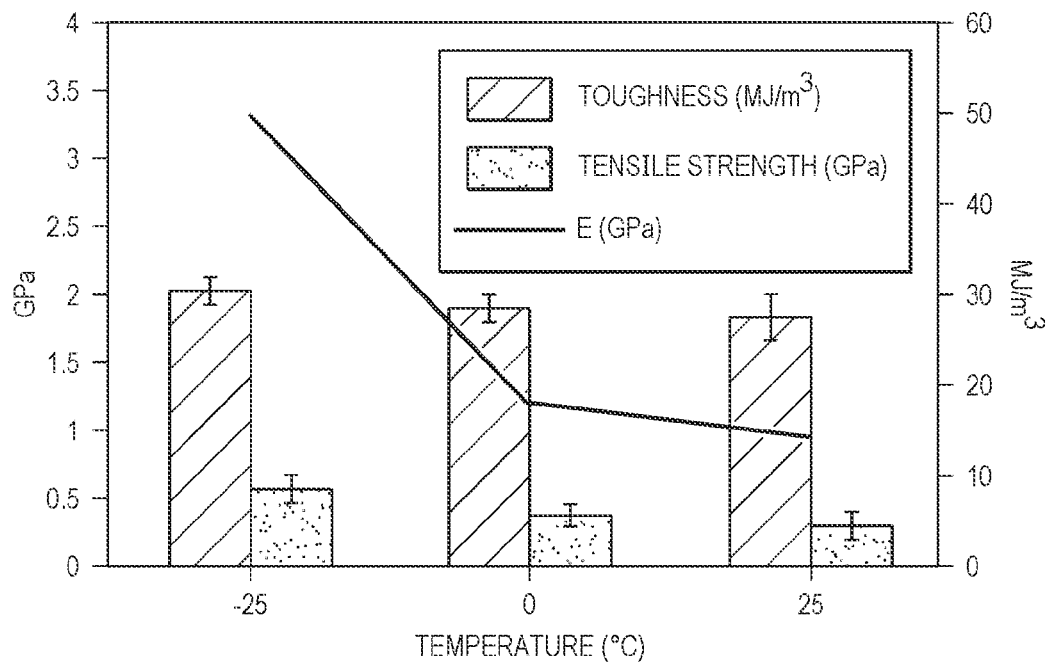

The mechanical properties of N-CNF/ZIHSCs were examined at cryogenic temperatures and shown in FIG. 3C and FIG. 3D. The results showed that the tensile strength and Young's modulus of the ZIHSCs increased with reducing temperature. This is likely due to the loss of molecular relaxation modes in the polymer at lower temperatures. However, the toughness did not change significantly with temperature, demonstrating the opposite changes of strength and ductility with reducing temperature. The enhanced mechanical properties of the ZIHSCs are mostly owed to the extremely high strength of unidirectional CNFs mats at low strain and metallic behavior of zinc metal at high strain, which is preserved in cryogenic conditions. The first peak in the stress-strain curves is attributed to the failure of either A-CNF or N-CNF mats. Using the rule of mixture with the same volume contribution in the thickness, CNF mats and zinc components contributed about 65% and 35% to the strength. In addition, higher ductility for CNFs mats (2.84%) as compared to recent results on A-CNF alone without the contribution of the electrolyte (2.12%) was observed. This can be attributed to composite action, with the electrolyte allowing the broken fibers to carry strain, or partial sliding between fibers.

Figure 6:
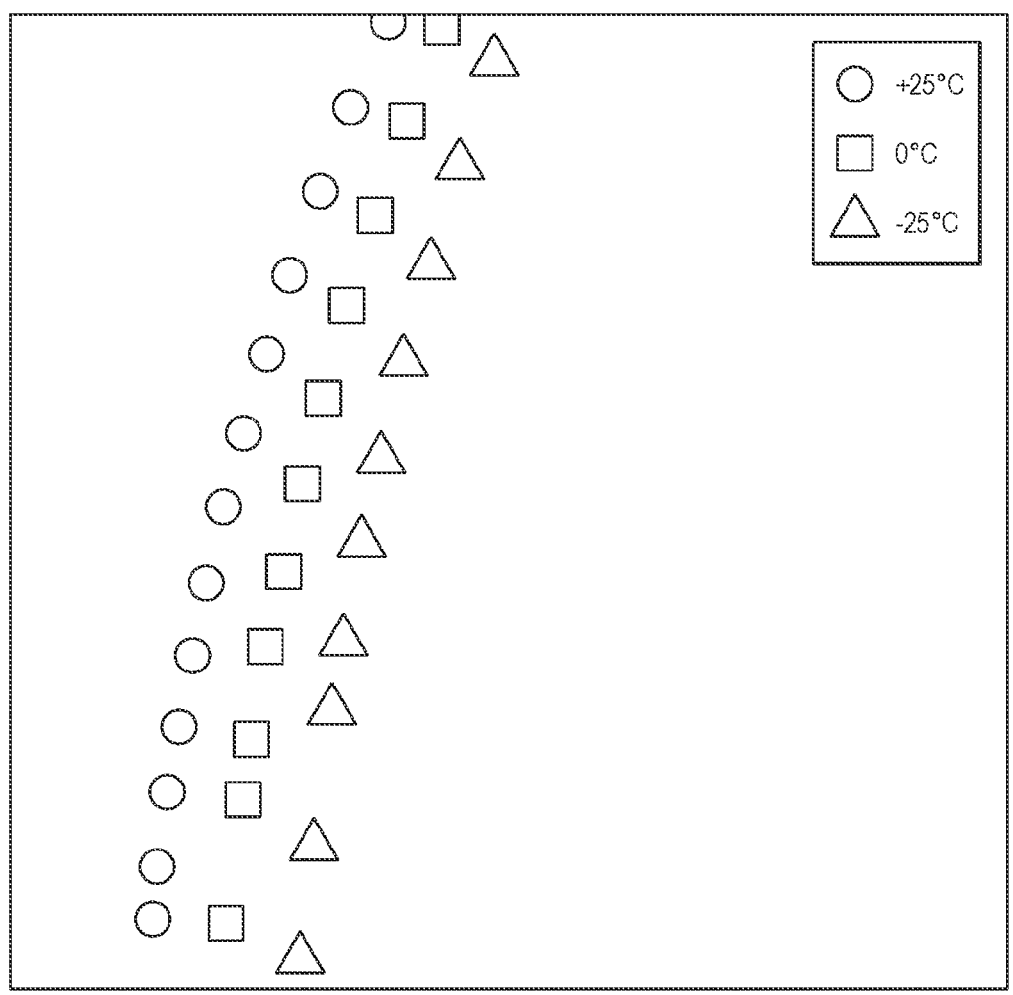
FIG. 6 illustrates Nyquist plots of N-CNF/ZIHSCs

Electrochemical Performance of ZIHSCs. Ionic conductivity of the gel electrolyte used as an ionic conductive separator is a feature of every ZIHSC. Hydrogel electrolyte performance generally deteriorates in cryogenic conditions due to suppressed ion-conducting behavior at freezing point. To evaluate the electrolyte behavior at low-temperature conditions, the ionic conductivity of the gel electrolyte was examined and results are shown in FIG. 6. To obtain the ionic conductivity of the gel electrolyte, Equation 1 is used.

$$k = \frac{t}{R_b A} \quad \text{Equation 1}$$

where k, t, and A are the ionic conductivity of the electrolyte, the electrolyte thickness, and the electrolyte/electrode interface area, respectively. The electrolyte bulk resistance ($R_b$) for different temperatures was obtained from AC impedance plots (FIG. 6). The k-value decreases with decreasing temperature to −25° C. (at −25° C., k~5.9 mS/cm; at 0° C., k~7 mS/cm; at 25° C., k~8.3 mS/cm), which is due to an imposed limitation in segmental mobility of polymer chains at low temperature. However, the k-drop with temperature was not significant, and the ionic conductivity at −25° C. was measured to be 5.9 mS/cm, which is a remarkable value when compared to the performance at 25° C. (8.3 mS/cm).

Electrochemical stability window was also examined, as it is a parameter associated with a gel electrolyte for actual applications. The linear sweep voltammogram (LSV) for the synthesized gel electrolyte was obtained at a scan rate of 5 mV/s at 25° C. The LSV curve showed a stable condition (no current response) in the voltage window of 0.0 V to 2.45 V, which is significantly larger than that of aqueous counterparts with voltage window of 1.6 V (note that the energy density scales with the second power of voltage).

To evaluate the electrochemical capability of different cathode materials, the galvanostatic charge-discharge (GCD) curves of A-CNF/ZIHSCs and N-CNF/ZIHSCs as a function of current density in an asymmetric two electrode system were examined, as exhibited in FIG. 4A and FIG. 4B, respectively. At 25° C., the specific capacitances were 180.6, 156.7, 130.1, and 84.8 F/g in the case of A-CNF cathode and 251.4, 210.0, 186.2, 150.3 F/g for the current densities of 0.5, 1, 2, and 5 A/g, respectively. Therefore, the N-CNF/ZIHSCs present much higher capacity than those of A-CNFs and are superior to a majority of recently-reported ZIHSCs. In several studies, it was shown that N dopants and electron-rich oxygen significantly improve the pseudocapacitance contribution, the wettability of carbonaceous materials, and consequently the available active surface for ions' absorption. In addition, the higher capacitance of N-CNFs than that of A-CNFs is attributed to the contribution of N-dopants to the pseudocapacitance (as the GCD curves exhibit less symmetry) and elevated electrical conductivity.

Figure 4E:
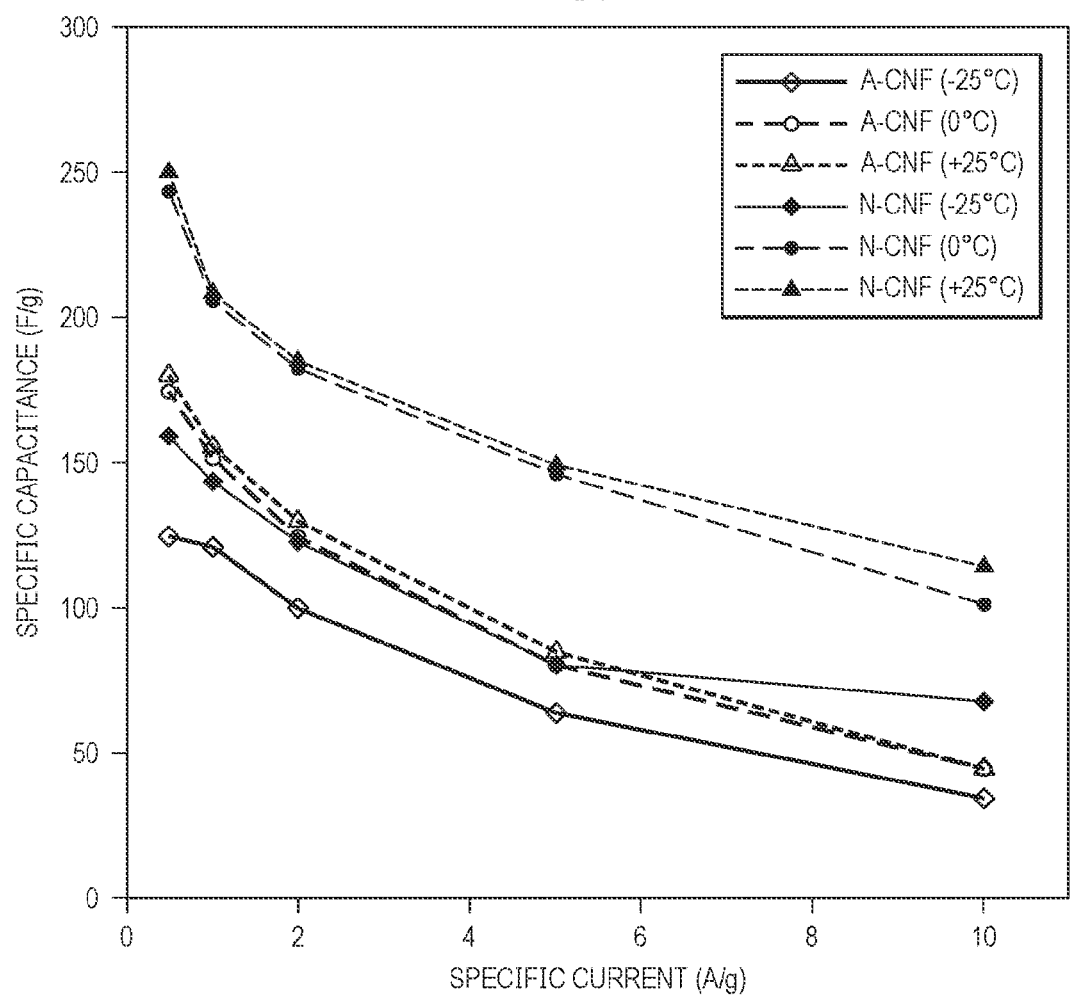

To evaluate the performance of the assembled ZIHSCs in environmental conditions, their electrochemical properties were further examined at −25° C., 0° C., and 25° C. FIG. 4C and FIG. 4D compared the GCD curves of A-CNF cathode- and N-CNF/ZIHSCs at different temperatures, respectively. Comparison of the GCD curves at 2 A/g and 0.5 A/g clearly show higher symmetry of the GCD curves and lower capacitance at a lower temperature. The ion diffusion and reaction kinetics generally decelerate with decreasing temperature, resulting in lower capacitance. The effect of reduced temperature on energy storage is shown in FIG. 4E. As the temperature decreased from 25° C. to 0° C., both A-CNF and N-CNF/ZIHSCs experienced less capacitance drop than from a further decrease of 0° C. to −25° C.

In terms of energy storage capability, a high energy density of 80.8 Wh/kg at a power density of 147.3 W/kg in the case of the N-CNF/ZIHSCs and a high energy density of 58.1 Wh/kg at a power density of 145.0 W/kg in the case of the A-CNF/ZIHSCs were obtained at 25° C. Although the energy density results at 25° C. and 0° C. were very close, the ZIHSCs underwent a drop in the range of 30-40% after reducing the temperature to −25° C. Compared to the reported values for the conventional ZIHSCs in the literature, both N-CNF and A-CNF cathodes possess exceptional gravimetric energy and power densities, which are close to the energy density of efficient batteries and power density of efficient SCs.

Figure 4F:
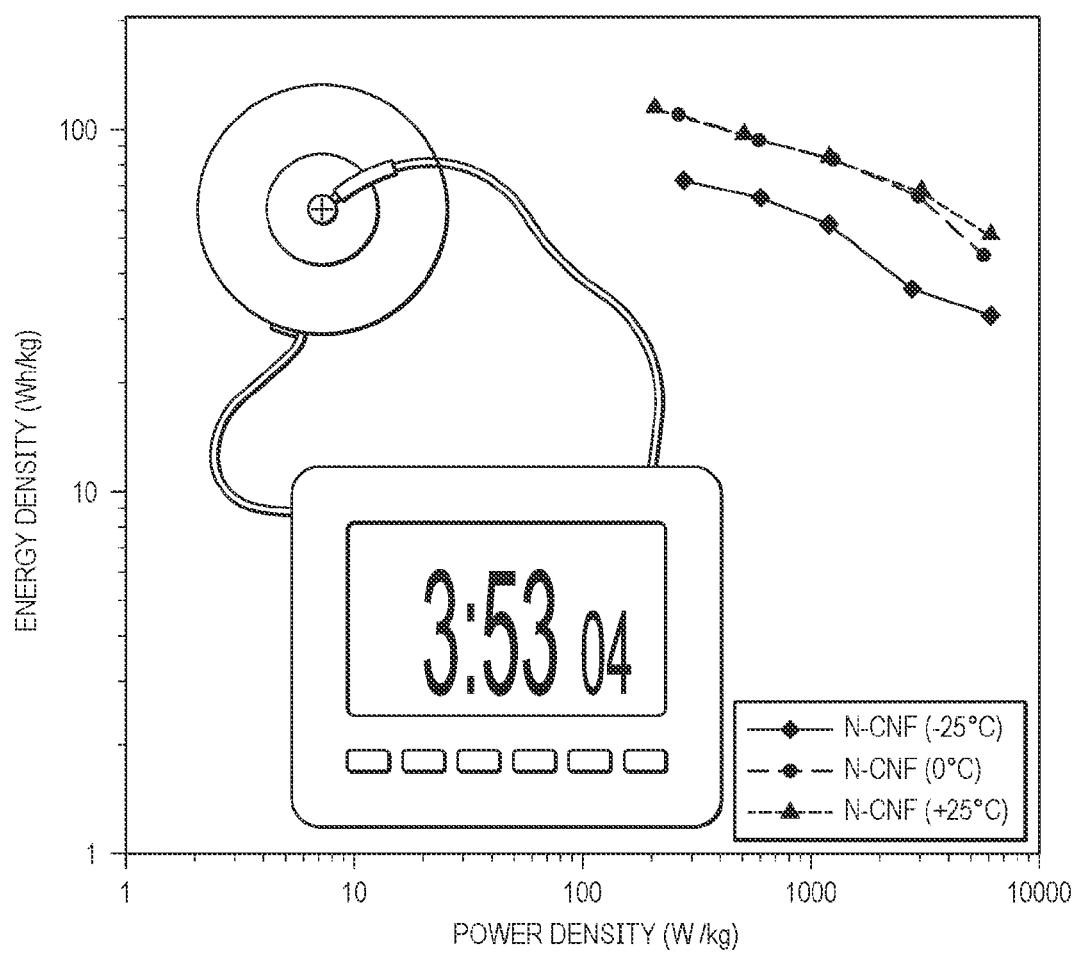

The combination of appropriate properties such as high specific surface area, transporting and storing ions in micro-sized and nano-sized channels, and wettability are the main reasons for achieving such high electrochemical performance. FIG. 4F also shows a practical test of a N-CNF (3 mg)-included ZIHSC in a split-able test cell (EQ-HSTC split-able test cell) that was charged for 30 seconds by a AA battery and used to power an electronic watch, with the resultant run time clearly visible.

Figure 4G:
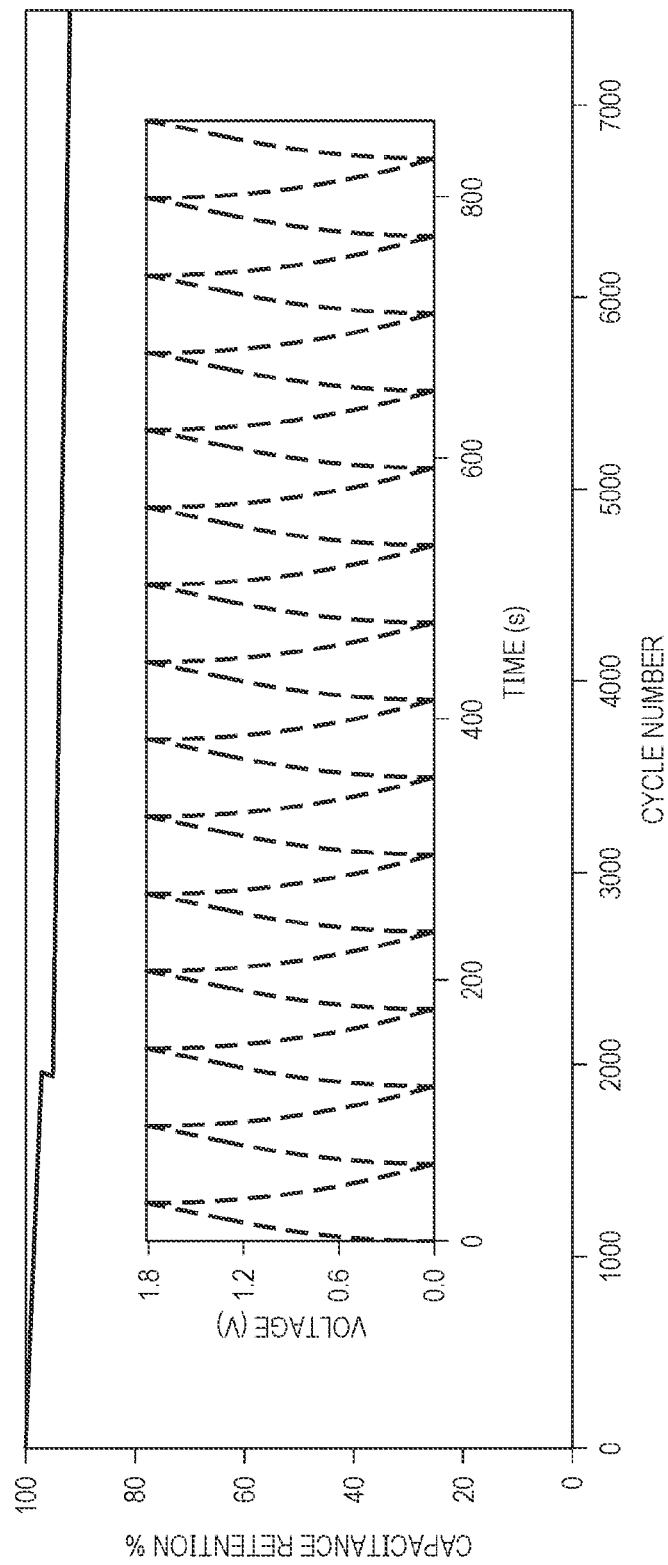
Figure 4H:
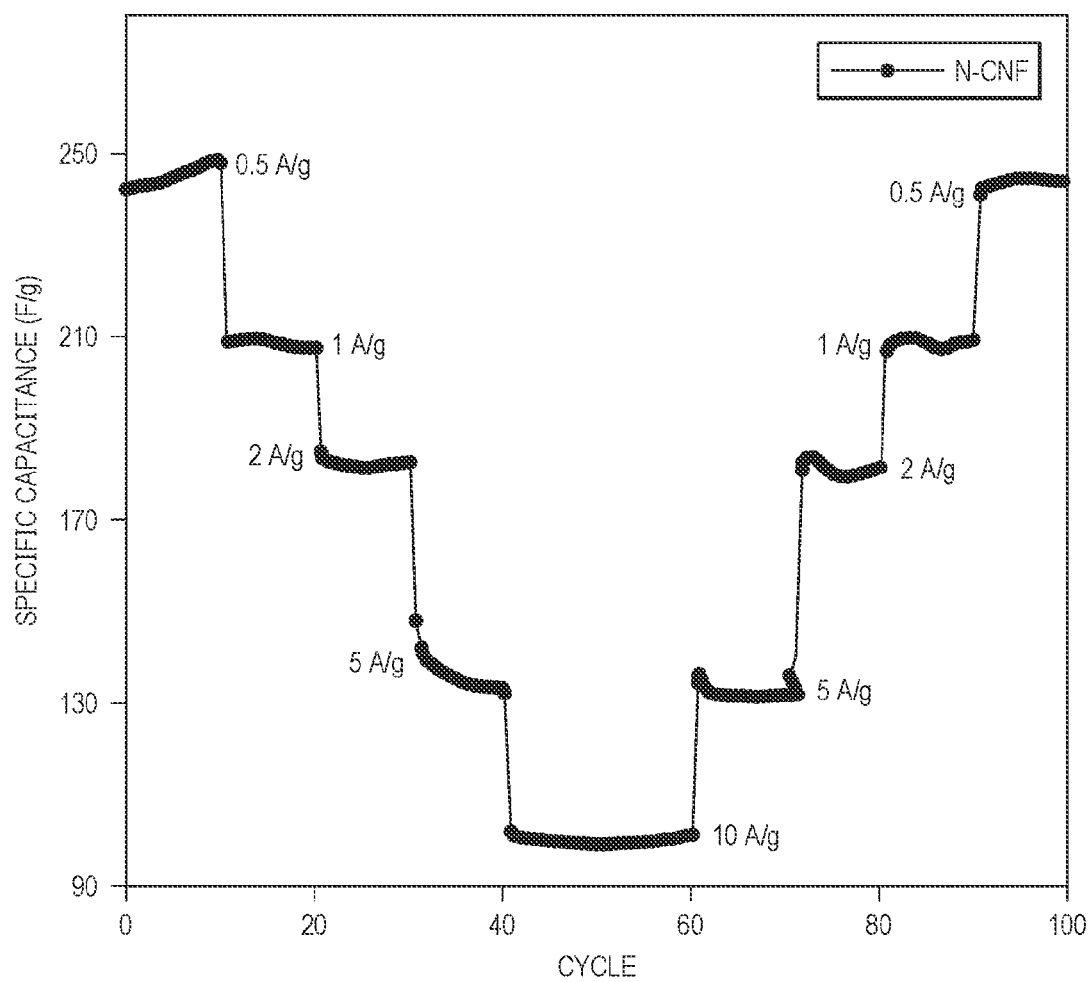

The cycling stability of the as-prepared N-CNF/ZIHSCs was assessed at a current density of 10 A/g, as shown in FIG. 4G. After 7500 charge/discharge cycles, nearly 94% of the initial specific capacitance was retained, demonstrating excellent electrochemical stability. This performance was measured despite the fact that the charge-discharge cycles at high current densities such as 10 A/g have been shown to destroy the electrochemically unstable structure of electrode materials, leading to rapid loss of capacitance. A subsample of the final charge-discharge cycles are provided as the inset in FIG. 4G to show detail. The similar charge and discharge behavior present in the last cycle curves indicates promising long-term cycling stability of the as-prepared ZIHSCs for actual service. Unlike zinc-ion batteries, as-prepared N-CNF/ZIHSCs also delivered exceptional rate capability (FIG. 4H) at current densities from 0.5 to 10 A/g at 0° C. The drops in capacitance were less than 2% after increasing the current density from 0.5 A/g to 10 A/g and reducing it back to 0.5 A/g. When the current density was returned to 0.5 A/g, more than 98% of the specific capacitance was restored.

Figure 4I:
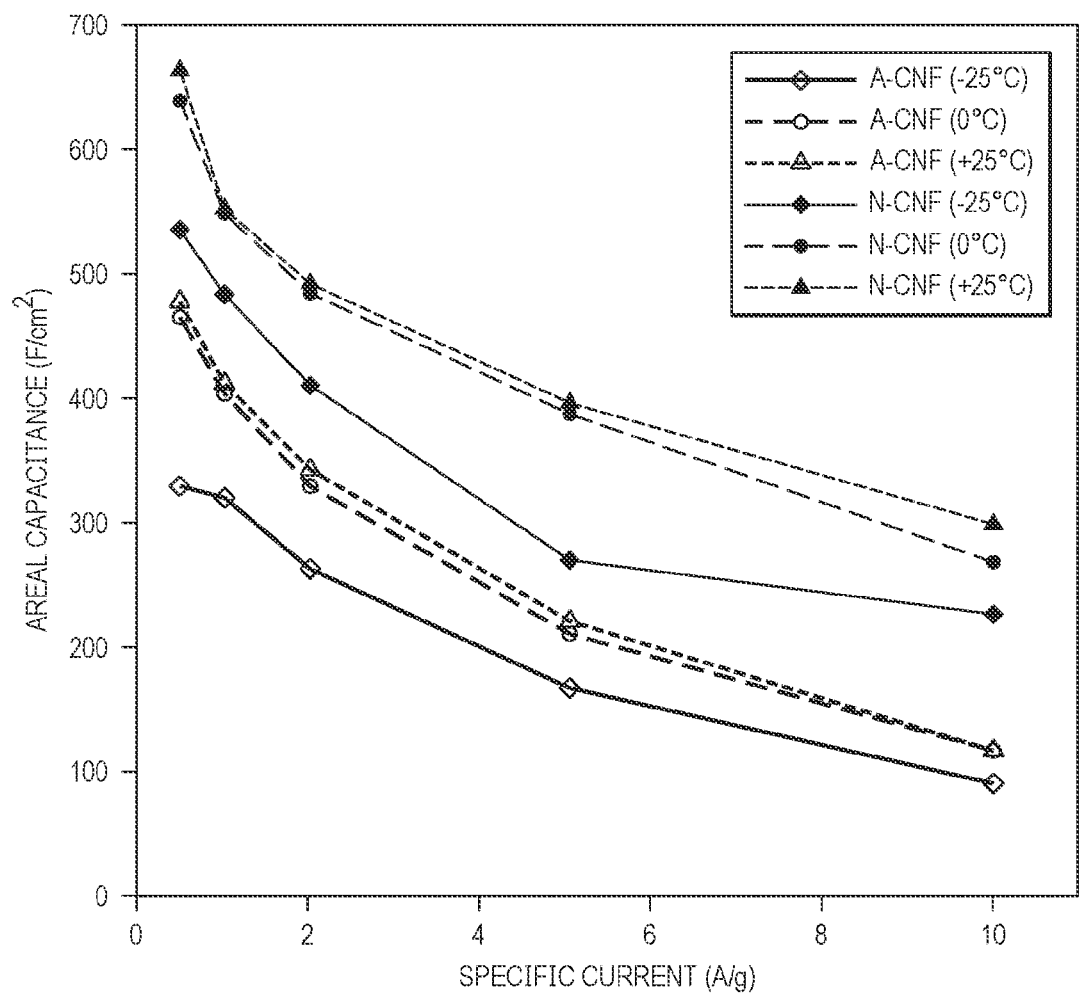
Figure 4J:
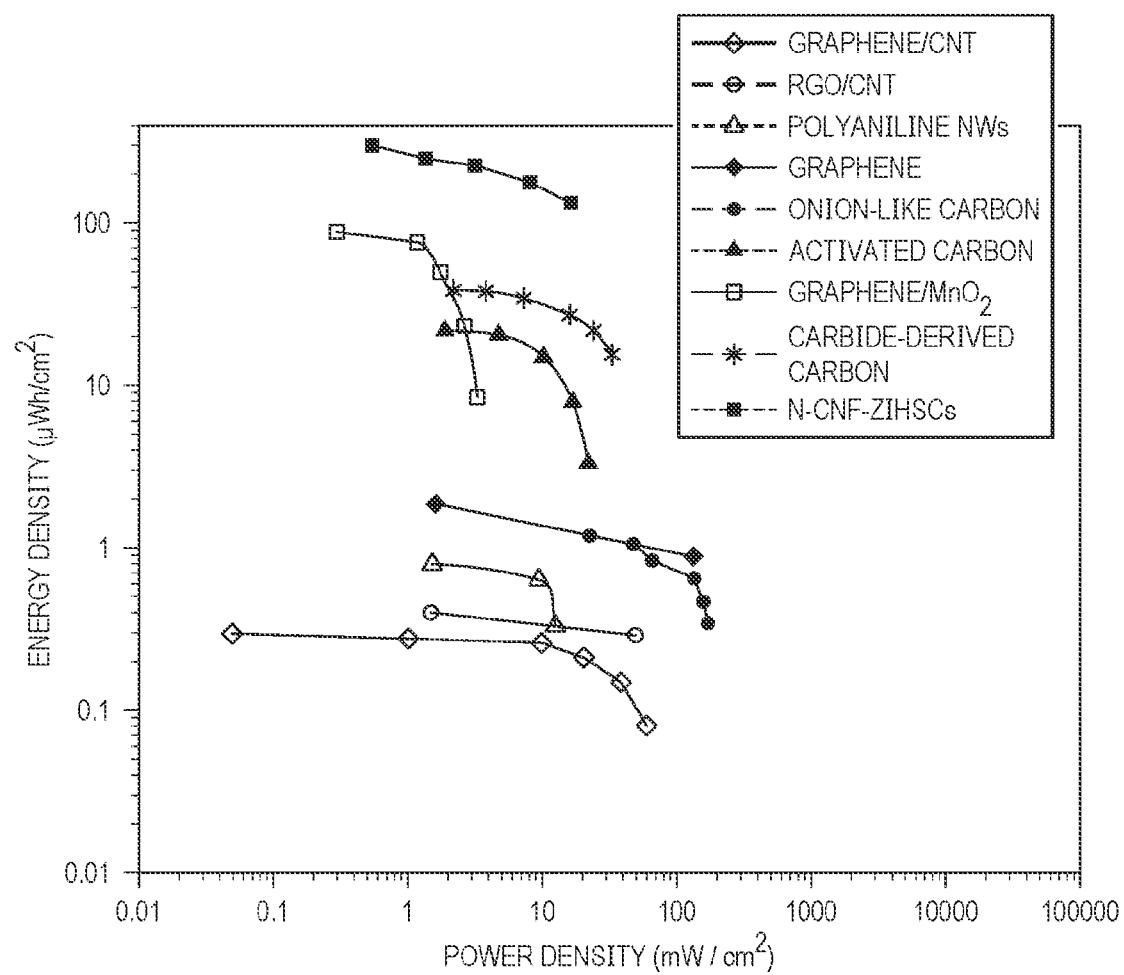

High areal electrochemical properties are necessary for construction of miniaturized energy storage devices. At temperature range of 0° C. to 25° C., the N-CNF/ZIHSCs offered a high areal capacitance>600 mF/cm² at 0.5 A/g (FIG. 4I). This was largely maintained at lower temperatures; reducing the temperature from 0° C. to −25° C., the areal capacitance dropped to 537 mF/cm². The areal efficiency of the structural ZIHSCs produced in this study (as represented with N-CNF and A-CNF in the FIG. 4J) was compared with other recently-reported efficient hybrid SCs in the literature by collecting all the data in a Ragone plot. A remarkable areal energy density of 71.4 µWh cm⁻² in the case of N-CNF/ZIHSCs and 51.33 µWh cm⁻² in the case of A-CNF/ZIHSCs were obtained. The results are greater than values reported for a wide variety of promising materials, including graphene/carbon nanotubes (Gr/CNT), reduced graphene oxide/carbon nanotube (RGO/CNT), Polyaniline Nanowires (PA-NWs), Graphene (Gr), Onion-like Carbon (OLC), and Activated Carbon (AC). They were also close to efficient Graphene/MnO₂ (Gr/MnO₂) and Carbide-derived Carbon (CDC).

Figure 4K:
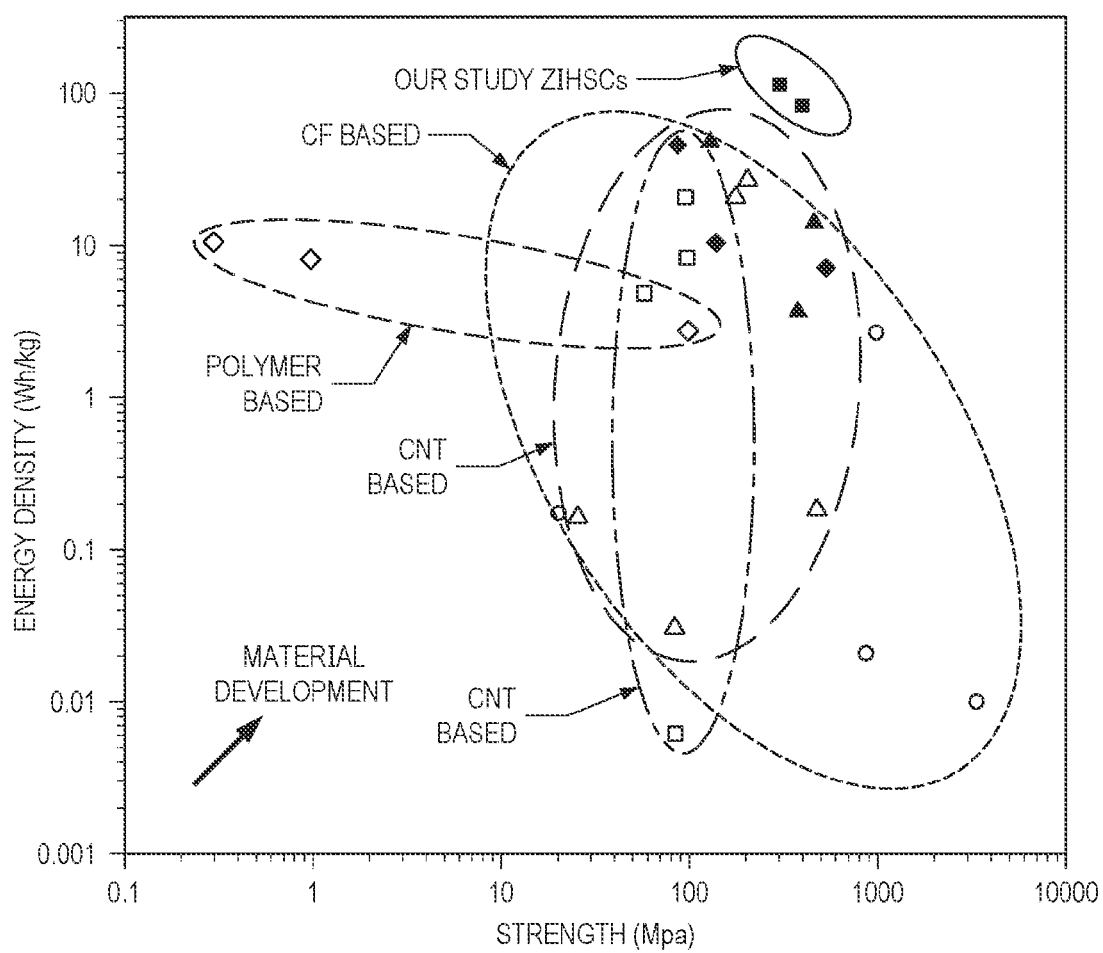

In order to consider both mechanical and electrochemical performance simultaneously, an Ashby plot (electrochemical energy density vs strength) was plotted to compare these results with those from the literature, FIG. 4K. As shown, the energy density of as-prepared structural ZIHSCs is twice the most efficient structural supercapacitors and batteries. It confirms that activation and N-doping processes address the common drawback of the most mechanically-effective carbon fiber families (CF), which is low energy density. In terms of mechanical properties, the as-prepared structural ZIHSCs are of the strongest, toughest and stiffest energy storage designs so far. Considering the same weight for both functionalities (load bearing and energy storage) of a structural energy storage device, the materials with the higher value of the combined index E. of, where E and of are respectively energy density and failure strength, are more desirable. In other words, favorable material development should be toward the top right corner of the Ashby chart, where the as-prepared ZIHSCs lie. Therefore, the ZIHSCs outperform all other recently reported materials when taking both functionalities into account. The laminated ZIHSCs combine into a single package the metallic toughness of zinc, strength and young modulus of CNFs, and electrochemical properties of a highly porous carbon-based structure. This result offers a simple strategy to fabricate extremely strong and stiff energy storage devices with outstanding electrochemical properties that does not show an undesirable trade-off in capacitance.

Figure 5A:
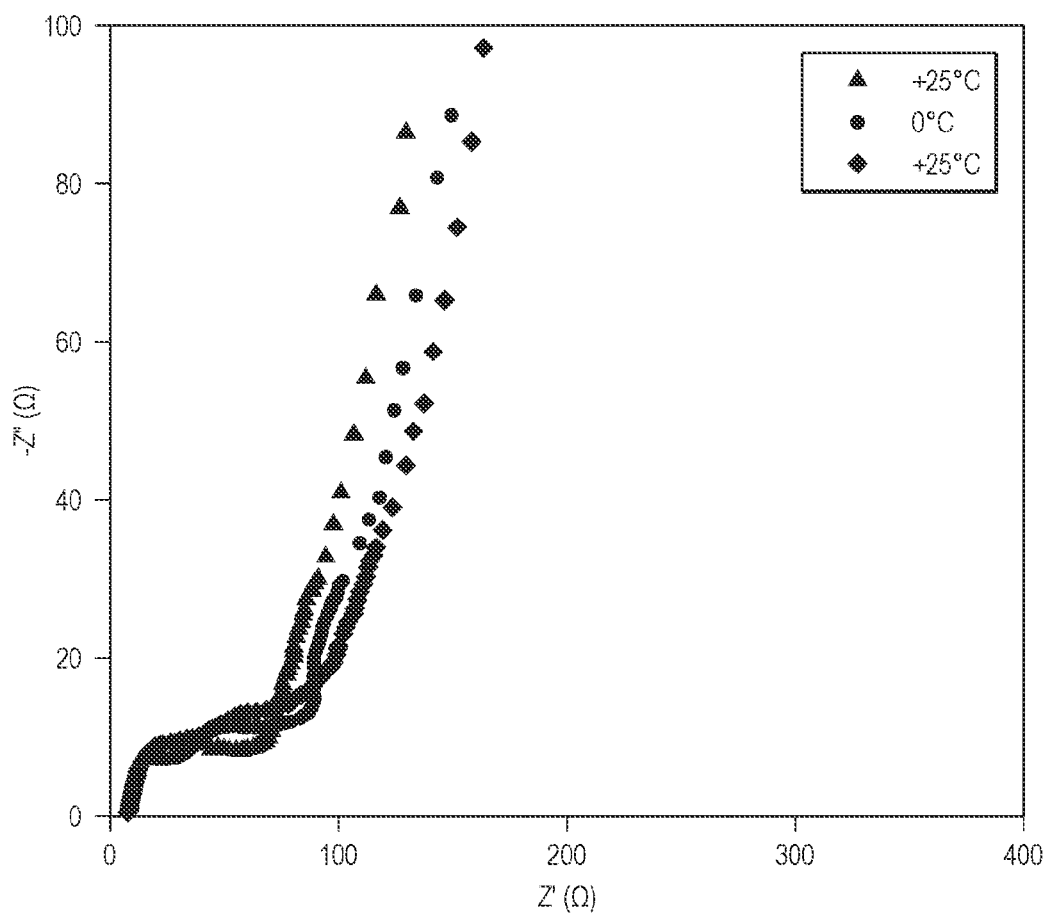

Kinetics and energy storage mechanism. To determine the ion diffusion/transport resistance of the electrolyte, and the electrochemical behaviors at different temperatures, the electrochemical impedance spectra (EIS) were measured for N-CNF/ZIHSC, as shown in FIG. 5A. Inherent poor electronic resistance of aligned N-CNFs and significantly-wide distribution of pores facilitates the transport of electrons and electrolyte ions during the charge-discharge process, resulting in low charge transfer resistance in the as-assembled ZIHSC cells. In the Nyquist curves associated with different temperatures, a small semicircle and a line shown in the high- and low-frequency regions correspond to the charge-transfer and diffusion processes, respectively. The diameters of the small semicircle regions are about the same for different temperatures. With reducing temperature from 25° C. to −25° C., the ohmic resistance increased from 6.015 to 8.434Ω and the slope in the low-frequency regions decreased. The slope of the line in the low-frequency regions is inversely proportional to the diffusion resistance of $Zn^{2+}$ ions in the electrolyte. While higher temperature is more suitable for quick charge transfer and zinc ion exchanges at the interface of the electrode/electrolyte, the measured drops in ohmic resistance and slope were insignificant.

Figure 5B:
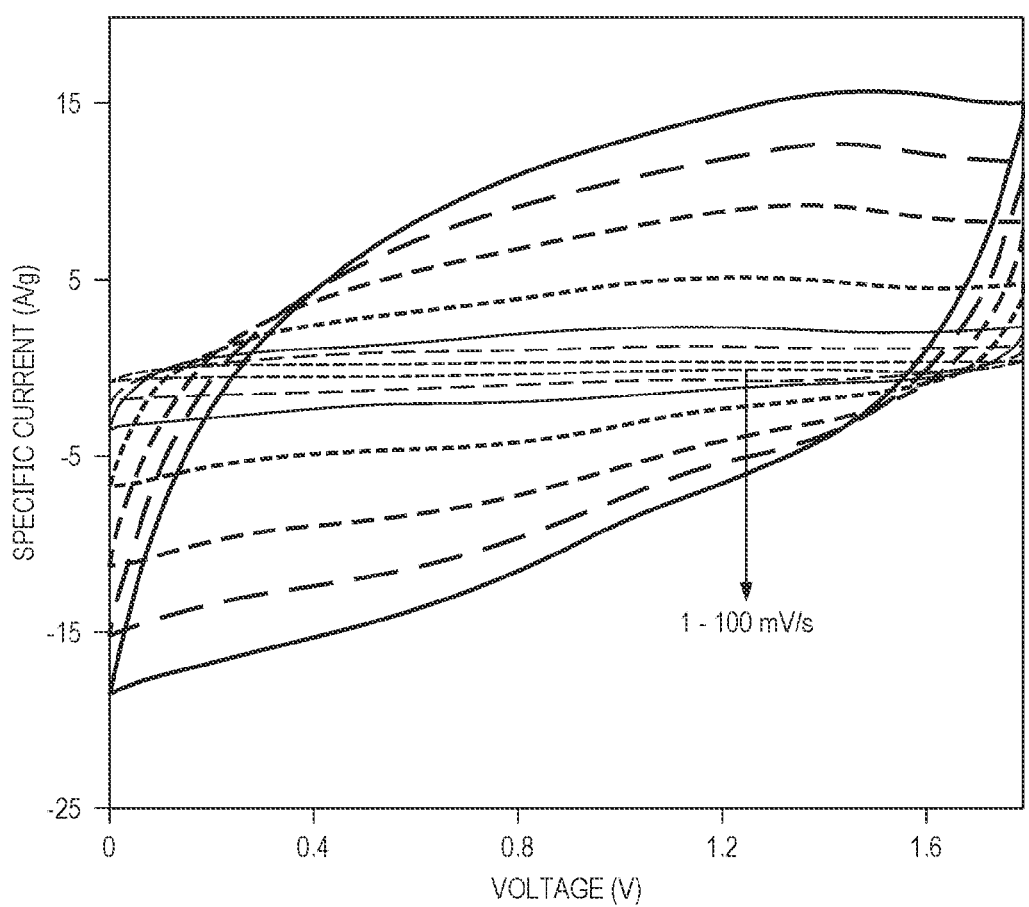
Figure 5C:
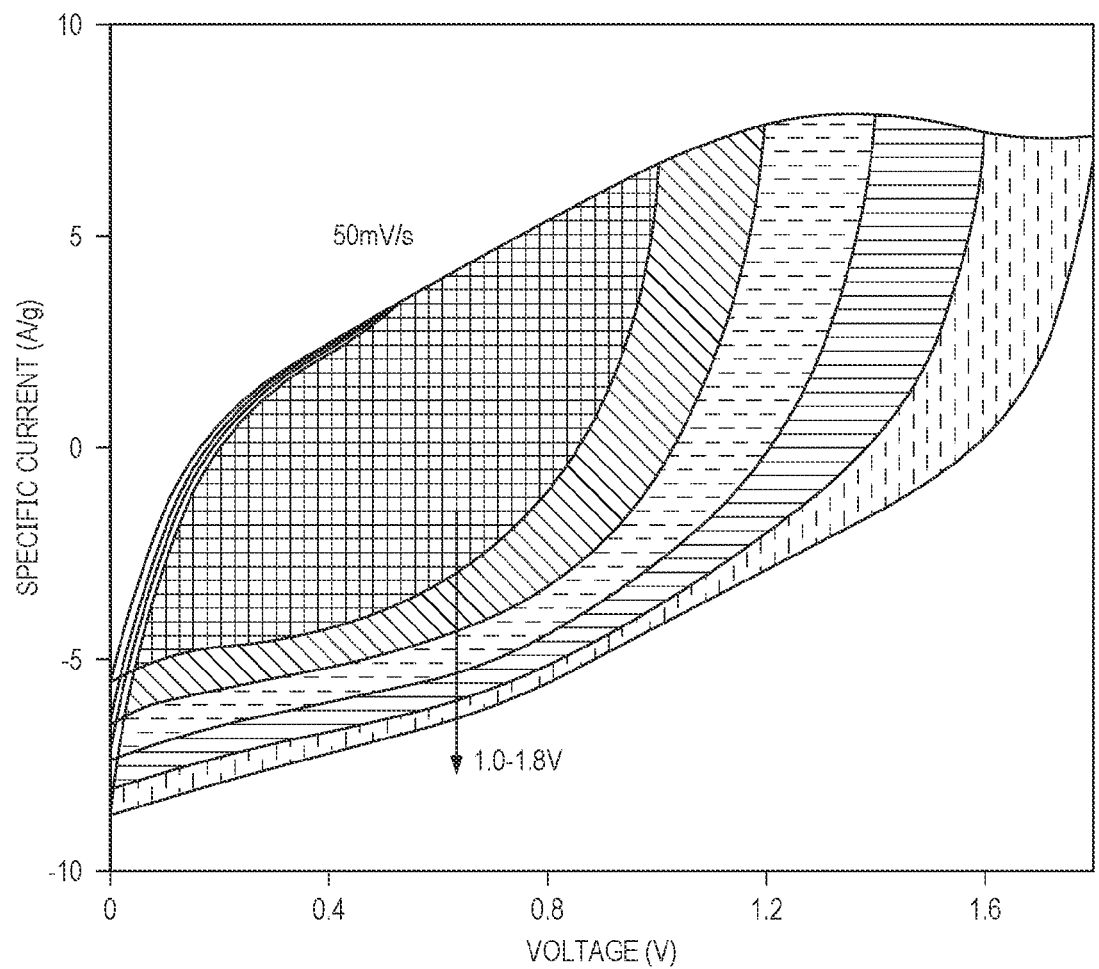

Dunn's method was employed to assess the energy storage mechanisms and kinetics. As shown in FIG. 5B, the CV curves of N-CNF/ZIHSCs showed no noticeable deformation from low scan rate of 1 mV/s to high scan rate of 100 mV/s at 25° C., indicating quick kinetics and rechargeability. The same electrochemical behavior was observed in the case of A-CNF/ZIHSCs. In addition, the CV curves of N-CNF/ZIHSCs at scan rate of 50 mV/s (FIG. 5C) showed that the potential window is practical and the material possesses stable electrochemical behaviors at various voltage windows from 1 to 1.8 V, which is in good agreement with the LSV results. Since the CV curves obtained are slightly different from the common electrochemical double layer-based rectangular curves, it may be concluded that a combination of diffusion and capacitive mechanisms are observed. The small deviation of CV curves from the perfectly rectangular shape in EDL-based SCs is dominated by deposition/stripping of $Zn^{2+}$ ions on the anode material (Zinc foil) and reversible ion adsorption/desorption on the cathode material (either N-CNF or A-CNF mats). Commonly, energy storage mechanisms are examined by estimating the b-value in Equation 2.

$$i = av^b \quad \text{Equation 2}$$

where i and v are the peak current in the CV curves and scan rate, respectively. Also, a and b values are adjustable constants, of which b value is utilized as an indicator for defining the mechanism of energy storage. The b value is 0.5 in the case of a dominant diffusion-controlled mechanism and 1 for a dominant capacitive mechanism. For the N-CNF/ZIHSCs (FIG. 5D), the b values for cathodic and anodic peaks were 0.83 and 0.92, respectively. These values confirmed that the electrochemical kinetics were largely capacitive with a minor contribution from diffusion of zinc ions into the electrodes. To demonstrate the quantities of each mechanism, $k_1$ and $k_2$ constants were determined in Equation 3 as a function of potential (V).

$$i = i_{cap} + i_{diff} = k_1 v + k_2 v^{1/2} \quad \text{Equation 3}$$

To determine $k_1$ and $k_2$ constants, Equation 4 can be used to simplify the procedure.

$$i/v^{1/2} = k_1 v^{1/2} + k_2 \quad \text{Equation 4}$$

Figure 5E:
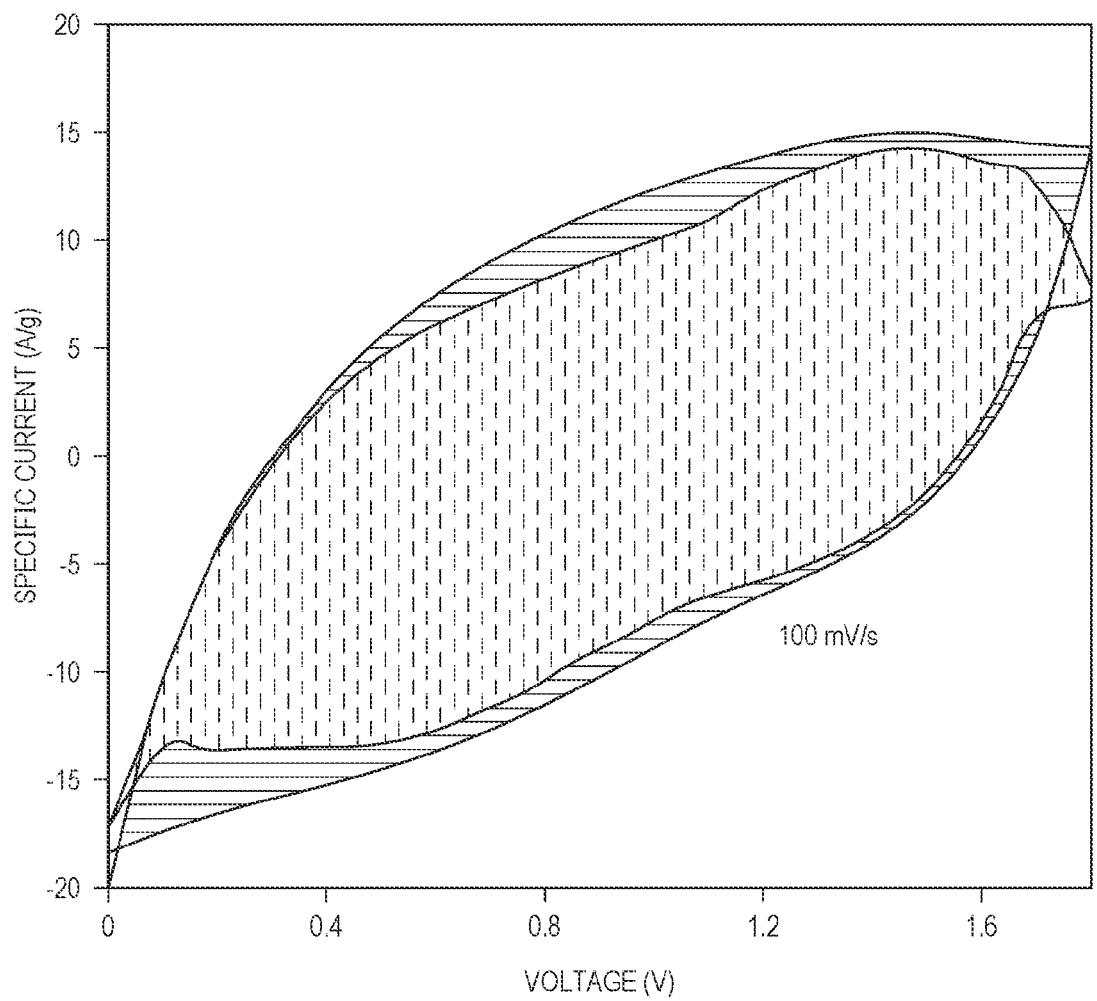
Figure 5F:
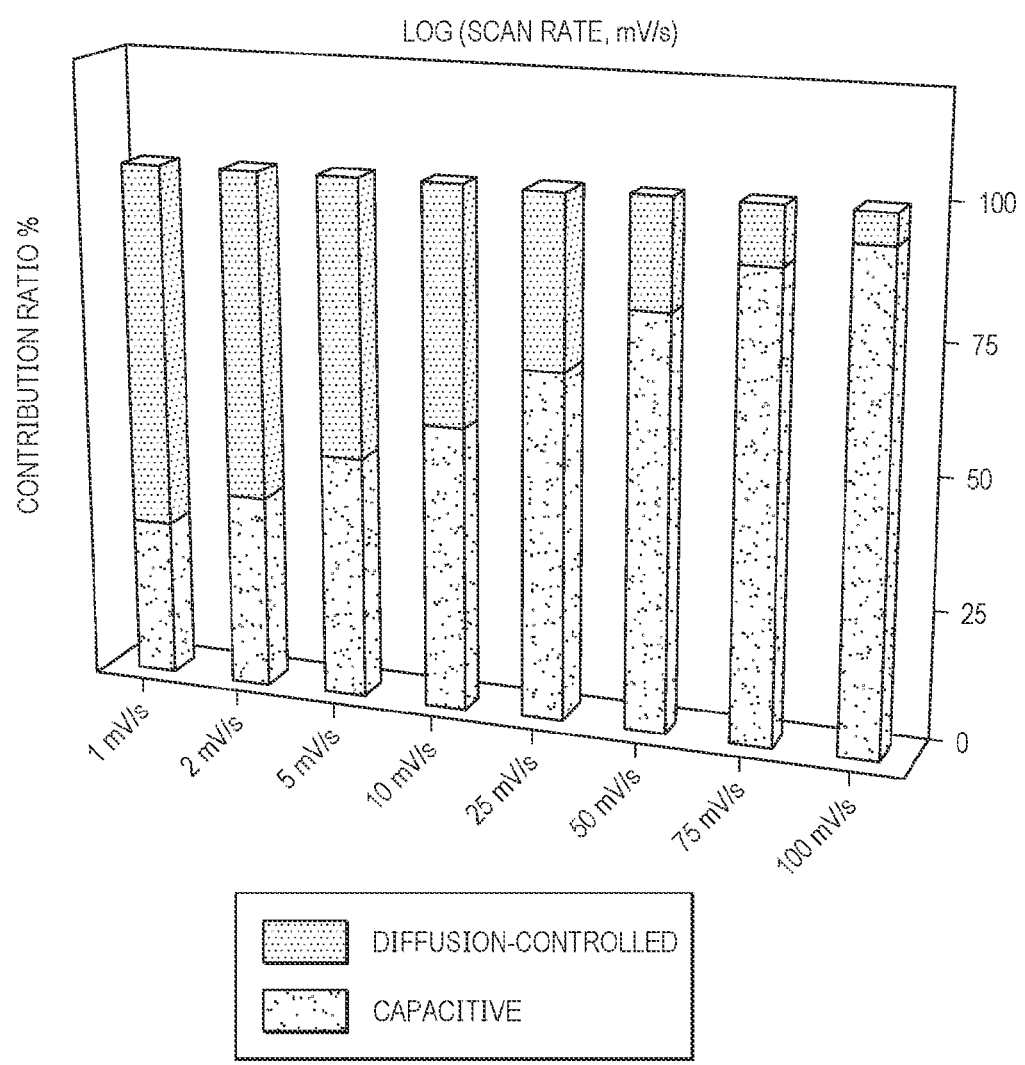

For instance, the capacitive contribution at scan rate of 100 mV/s was determined to be 93% of the total current contributed in energy storage for the N-CNF cathode ZIHSC (the lower and upper shaded areas in FIG. 5E show the diffusion and capacitive contributions respectively). As expected, the diffusion contribution increased with reducing scan rate. The bar chart in FIG. 5F further summarizes the contributions of capacitive and diffusion-controlled mechanisms as a function of scan rate. Oxygen- and nitrogen-containing functional groups decorated] on the fibers' surface and inside the pores intensify the faradaic reaction at low scan rates, resulting in superior contribution of the diffusion-controlled mechanism.

Regarding the high electrochemical properties of the as-prepared ZIHSCs, the synthesized N-CNF and A-CNF cathode materials contain micro- and nano-sized pores and a graphitic turbostratic interlayer spacing of ~5 A°, as demonstrated in previous studies. The micro-pores and the interlayer spacing of graphitic turbostratic domains provide large electrode/electrolyte interfaces to reduce the transport length of the zinc ions and accelerate charge-transfer reactions. In addition, pores can also play a role as zinc ion reservoirs. In the ZIHSCS of the present disclosure, $Zn^{2+}$ ions deposit on the zinc foil and $CF_3SO_3^-$ is adsorbed on the surface of the highly porous CNFs and stored inside the pores to form a double electric layer during charging. The opposite process takes place during discharge. A list of the proposed reactions in the presence of $Zn(CF_3SO_3)_2$ containing electrolytes is shown Table 2.

TABLE 2

List of the proposed reactions in the presence of $Zn(CF_3SO_3)_2$-containing electrolytes Anode Electrode $Zn^{2+} + 2e^- \leftrightarrow Zn$
Cathode Electrode $N-CNF + CF_3SO_3 \leftrightarrow CF_3SO_3^-\|N-CNF$
$N-CNF-OH + Zn^{2+} + e- \leftrightarrow N-CNF \ldots O \ldots Zn + H^+$
$N-CNF-CO-OH + Zn^{2+} + e^- \leftrightarrow N-CNF-CO \ldots O \ldots Zn + H^+$
$H_2O \leftrightarrow H^+ OH^-$
$2Zn^{2+} + 4OH^- + 2Zn(CF_3SO_3)_2 + 3H_2O \leftrightarrow 2[Zn(CF_3SO_3)2Zn(OH)_2]\cdot 3H_2O$ Regarding the higher capacitance of the N-doped samples than those of activated ones, the effect of the N-containing functional groups on the chemical interactions between the carbon surface and Zn ions has been previously studied. It was concluded that N dopants play an auxoaction to the faradic reaction and could dramatically improve the pseudocapacitance (energy density) of ZIHSCs. Through DFT modeling, it was determined that the thermoneutral Gibbs free energy of N-doped carbon-based structures like those in N-CNFs facilitates chemical adsorption of Zn ions.

Preparation of Cathode materials. To prepare free standing pristine carbon nanofiber (P-CNF), A-CNF, and N-CNF ribbons, PAN (0.91 g, $M_w$ of 150,000 g/mol), PMMA (0.91 g, $M_w$ of 15,000 g/mol), dimethylformamide (DMF, 8.18 g), and sodium dodecylbenzene sulfonate (SDBS, 23 mg) as a surfactant were sonicated by a tip-sonicator (Sonics VC 750) with 50% power for 20 min to prepare a homogeneous emulsion. The electrospinning process of the PAN:PMMA emulsion was performed at a flow rate of 1.3 ml hr$^{-1}$, 22±3° C., a voltage range of 15-20 kV, a distance between needle tip and collector of 20 cm, and relative humidity of 40±5% for 180±5 minutes. After collecting the fiber mats at a linear velocity of 3.9 m s$^{-1}$ (500 rpm), the partially-aligned mats were subsequently subjected to a hot-drawing process with hanging weights inside an oven at 135° C. to achieve a hot-drawing ratio of 2.5±0.2× (2.5±0.2 times longer than initial length). The as-prepared samples were then transferred to a convection oven at 285° C. for 2.5 hrs for stabilization. P-CNF was obtained after subjecting the resultant samples to carbonization step in a furnace at 900° C. for 1 hr under nitrogen atmosphere.

The free-standing, aligned P-CNF mats were then transferred into a container filled with 4M KOH aqueous solution for 3 hrs, dried at 80° C., then activated at 1,000° C. for 1 hr in a tube oven under nitrogen atmosphere. The free-standing, aligned A-CNF mats were prepared after rinsing and subsequent drying processes. During the activation process, many oxygen-containing functional groups initiate on/into the carbonous structure through the reactions between KOH and carbons.

Some of the free-standing, aligned A-CNF mats were transferred into an aqueous melamine solution (10 wt. %) at 90° C. for 1 hr. Then, the resultant samples were dried and transferred into a furnace at 1000° C. under nitrogen atmosphere for 1 hr to fabricate N-CNFs. The oxygen-containing functional groups on A-CNF(S) may react with melamine decomposition products ($C(NH_2)_2$=N—=N and $NH_2$—C≡N) to produce nitrogen-containing species (e.g., $C_2N_2^+$, $C_3N_2^+$, $C_3N_3^+$) which were the nitrogen sources for the N-doping process.

Preparation of the antifreezing gel electrolyte. Preparation of antifreezing gel was performed according to methods previously reported with slight modification. The antifreezing gel electrolyte was prepared by dissolving 3.635 g zinc trifluoromethanesulfonate ($Zn(CF_3SO_3)_2$) into 10 mL solution of distilled water and ethylene glycol with weight ratio of 1:2. After preparing a transparent solution, 1 g of PVA was added and stirred at 95±5° C. for 5 hr. The resultant solution was ultrasonicated for 15 min to eliminate air bubbles and then transferred into the desired mold and subjected to repeated freeze/thaw cycles to achieve a transparent and flexible hydrogel.

Fabrication of symmetric all-solid-state SCs. To assemble a ZIHSCs, the zinc foil electrode was first blade-coated with the antifreezing electrolyte solution and then sandwiched with either unidirectional A-CNF or N-CNF mat, which had been cut into the desired final shape (rectangular for mechanical tests and circular for coin cell-based electrochemical tests). The sandwich structure was then transferred into a freezer at −25° C. to solidify the gel electrolyte. Upon solidification of the gel electrolyte, the ZIHSCs were transferred to a splitable test cell (EQ-HSTC split-able test cell) for electrochemical measurements. The mass of active material used in this study was in the range of 2-4 mg.

Mechanical and electrochemical characterization. An Instron 5543 single column table top tensile tester with a load cell rated to 1 kN was utilized to measure the strength and mechanical properties of the ZIHSCs. Experiments were performed at −25° C., 0° C., and 25° C. The mechanical properties of the samples were examined at −25° C. by a custom mixed-phase fluid set-up. A container with a slit at the bottom (dimensions selected based on the samples) was three-dimensionally (3D)-printed and a ZIHSC specimen was threaded through the cup. The end tabs were adhered on both sides of the specimen with a strong epoxy. Then, a seal with minimal shear strength was formed between the specimen and cup using a grease lubricant (inside) and two pieces of silicon rubber (outside) to avoid any leakage. Then, the container was filled with an ethylene glycol/water solution (41:59 vol. %). The freezing point of the solution was tuned to −25±3° C. The container was cooled down by slow addition of liquid nitrogen (adding liquid nitrogen into the container) to freeze the top layer of the solution. The top layer of formed ice was broken and the same procedure was repeated until a stable amount of floated ice was present in the solution. After obtaining a consistent reading of the desired temperature using a thermocouple, the test was initiated. The same procedure was repeated in the presence of deionized (DI)-water to measure the control mechanical properties at 0° C.

All the electrochemical tests were conducted by a CH Instrument 660E Bipotentiostat. The applied equations for calculating specific capacitance, energy and potential densities are provided in Appendix A. To perform electrochemical experiments at −25° C. and 0° C., two different refrigerators were used and the test cell was placed into it during electrochemical tests.

Conclusion. Presented herein is a cost-effective strategy to fabricate extremely strong, tough and stiff ZIHSCs with outstanding electrochemical properties, which do not suffer from the usual dramatic trade-off in capacitance. The obtained energy density approached that of lithium-ion batteries, and the mechanical properties were among the strongest, stiffest, and toughest state-of-the-art energy storage configurations. This disclosure combines several novelties to prepare mechanically-strong and electrochemically-efficient cathode materials. Hot-drawing of precursor is shown to be a good technique to enhance the turbostratic alignment and produce unidirectional CNF mats. This fabrication strategy resulted in improved mechanical properties for the structural ZIHSCs produced. The use of sacrificial PMMA, activation with KOH, and N-doping were very effective in improving the electrochemical properties of ZIHSCs and this approach facilitated robust chemical adsorption of Zn ions. Laminated ZIHSCs were found to offer high toughness, strength, and Young's modulus. The mechanical properties can be manipulated with minimum tradeoff between load bearing and energy storage capabilities.

The as-prepared structural ZIHSCs offer a battery-level gravimetric energy density of 80.2 Wh/kg and outstanding areal energy density of 600 mF/cm$^2$, which is almost twice the value reported for the most efficient structural SCs. Using a freeze-resistant electrolyte, excellent electrochemical properties were achieved in cryogenic conditions. The ZIHSCs with an N-CNF cathode deliver outstanding specific and areal energy densities, along with good cycling life after 7500 cycles. This is an operational solution for 0-100% fabrication of a new generation of structural energy storage devices with extremely high gravimetric and area energy density and favorable mechanical properties.

The preceding described a structural zinc ion hybrid micro-supercapacitor. The above illustrates a designed and developed, efficient and all-solid-state, structural zinc ion hybrid supercapacitor with simultaneous high energy storage and load-bearing capabilities for weight-restricted applications. The supercapacitors of the present disclosure can be used in, for example, body panels of a car in electronic devices. The structural ZIHSC is generally composed of a cathode material, that can include, without limitation, carbon nanofiber or carbon fiber mats, carbon nanotube mats, free-standing graphene oxide film, free-standing nitrogen-doped graphene film, electrochemically-active polymers, carbon-based yarns, and the like, an gel electrolyte (e.g., polyvinyl alcohol-water-ethylene glycol-Zn(CF$_3$SO$_3$)$_2$, polyvinylalcohol-water-ZnSO$_4$, polyvinyl alcohol-water-ZnCl$_2$, and the like), and a zinc foil anode. A type of anti-freezing hydrogel electrolyte can be utilized, which makes the structure suitable for applications in very low temperatures. For example, a PVA with a 60:40% solution of ethylene glycol:water was mixed in the presence of Zn(CF$_3$SO$_3$)$_2$. The supercapacitors can be fabricated by deposition of a thin layer of gel electrolyte (with or without a separator) between a zinc foil anode and a cathode material. The designed device shows promising electrochemical properties (e.g., energy density of ~50-100 Wh/kg), and load-bearing capability (e.g., tensile strength in the range of 100-400 MPa and Young's modulus in the range of 10-100 GPa).

Most of the structural energy storage serving as body panels for cars are suffering from low energy density, restricted lifespan, and poor mechanical properties. Most of the proposed designs are costly, unsafe, and include brittle materials. In addition, a majority of innovations employed supercapacitors which are suffering from low energy density.

Herein, for the first time, an efficient all-solid-state structural ZIHSCs with simultaneous high energy storage (e.g., energy density of ~100 Wh/kg and a lifetime of over 10,000 cycles) and excellent load-bearing capabilities (e.g., tensile strength of greater than 200 MPa, and toughness of greater than 200 kJ/m$^3$) is demonstrated. Unlike current Li-based structural energy storage designed by various car manufacturers, the developed strategy for fabrication of structural ZIHSCs as disclosed herein is scalable, inexpensive, and safe (especially in accidents). The obtained multi-layered ZIHSCs are ductile and malleable. The anode material can be used as corrosion-resistant interior or exterior materials. The anti-freezing and safe hydrogel electrolyte possesses good electrochemical properties in the temperature range of −25° C. to 25° C., and is additionally non-flammable. The PVA hydrogels have excellent mechanical properties in different temperatures due to the cross-links of PVA chains at low temperatures. They also display outstanding cyclic stability at −25° C., 0° C., and 25° C. Therefore, the multi-layered ZIHSCs as illustrated in FIG. 1B, provide a simplistic method of realizing the application of structural energy storage devices as the body panels of cars in electric vehicles.

There are some structural Li-based energy storage devices with good mechanical and electrochemical properties. However, safety concerns have limited their development. Most of the designed supercapacitors have either poor energy density or they are equipped with acidic/alkaline toxic and flammable organic electrolytes. Therefore, a less expensive and safer electrolyte is desired and is illustrated in the ZIHSCs disclosed herein. In addition, the mechanical properties of these assembled ZIHSCs were studied and found to have high strength, Young's modulus, and extremely high toughness. The high strength and Young's modulus of the laminated ZIHSCs are sourced by the CNF cathode material and high toughness by the zinc foil anode. As such, this disclosure contributes to the emergent of mechanically robust designs and materials for multifunctional energy storage systems, and this is applicable in a broad range of uses.

The maximum tensile strength, average Young's modulus, and toughness are shown to be 402.2 MPa, 15.45 GPa, and 2.18 MJ/m$^3$ in the case of the A-CNF/ZIHSCs and 308.3 MPa, 14.40 GPa, and 1.82 MJ/m$^3$ in the case of the N-CNF/ZIHSCs, respectively. The obtained values are significantly greater than reported values for other structural energy storage.

Figure 2C:
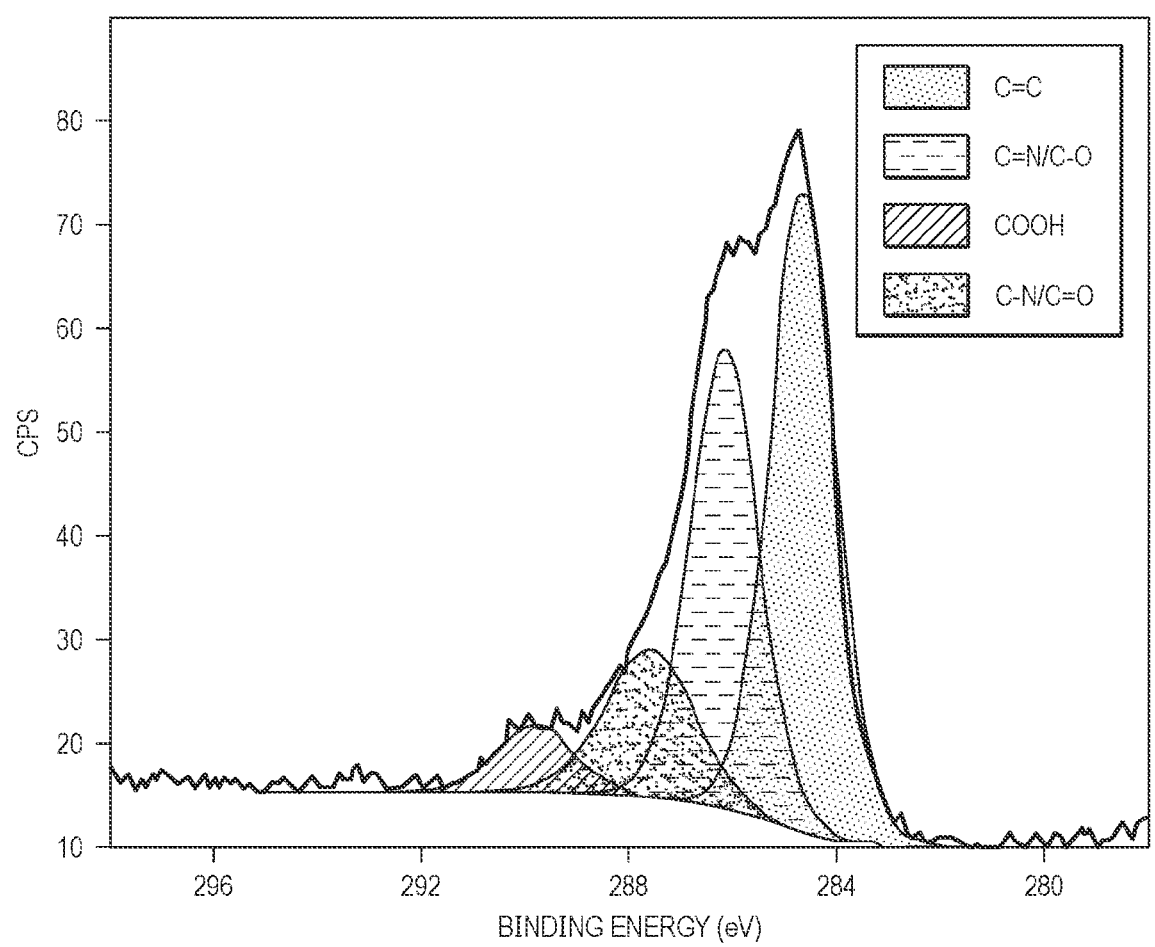
FIGS. 2C and 2E illustrate the C1s spectra of A-CNF and N-CNF, respectively.
Figure 2E:
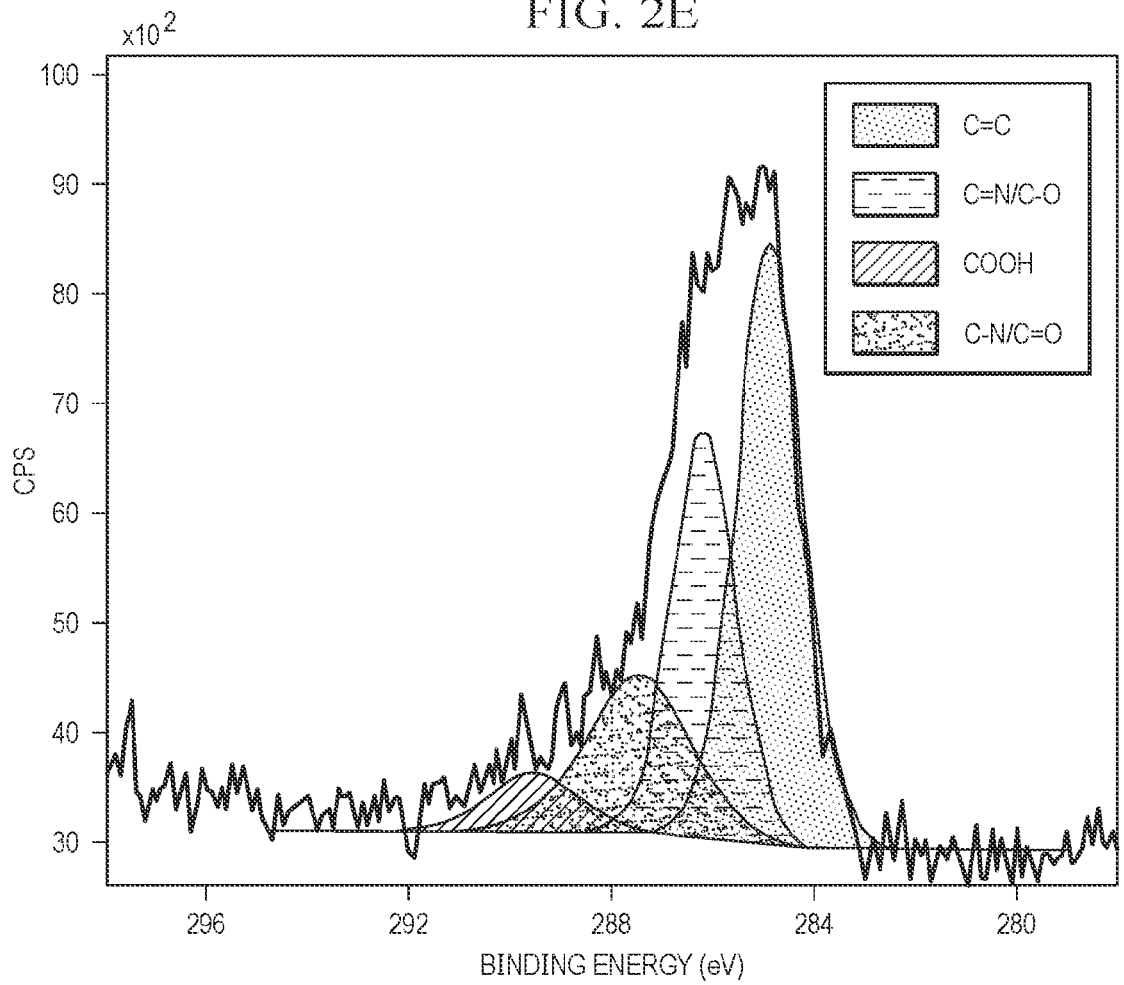
Figure 2F:
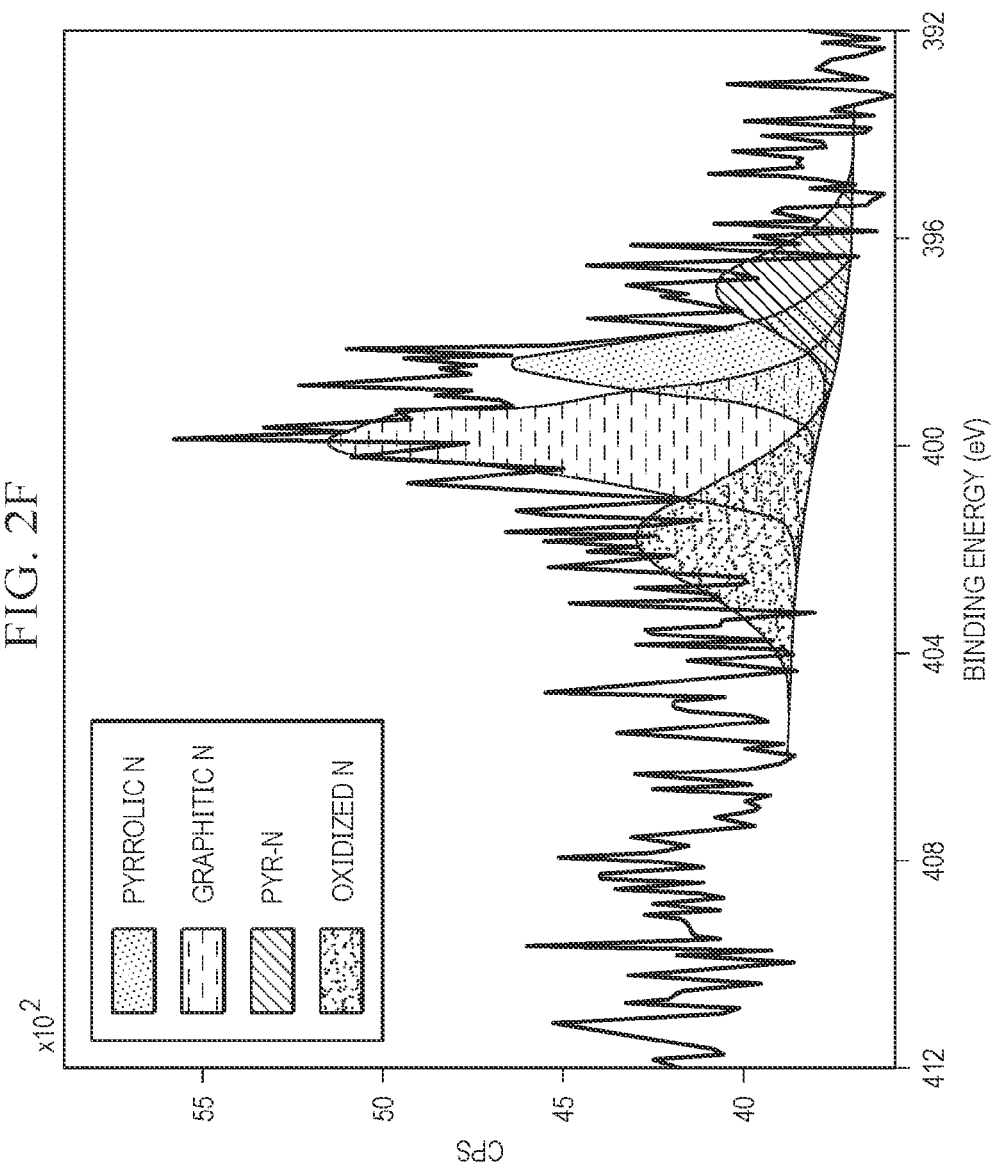

As mentioned above, the as-prepared ZIHSCs of the present disclosure includes a Zn foil anode, a highly-porous CNF-based cathode, and PVA/EG/water/Zn(CF$_3$SO$_3$)$_2$ electrolyte. This type of energy storage uses the reversible deposition/stripping process on zinc-based anode and adsorption/desorption of Zn$^{2+}$ ions on the surface of the cathode to store energy. The as-prepared free-standing N-CNF cathodes include both large and small pores and the interlayer spacing of graphitic turbostratic domains is approximately 0.5 nm. The micro-pores and the interlayer spacing of graphitic turbostratic domains provides large electrode/electrolyte interfaces to reduce Zn-based ions transport length and thus expedite charge-transfer reactions, while large pores can also serve as reservoirs for storage of different clusters of Zn-based ions. GCD techniques were used to evaluate the electrochemical properties of A-CNF and N-CNF. As shown in FIG. 2A and FIG. 2B, the specific capacitances were 180.6, 156.7, 130.1, and 84.8 F/g in the case of the A-CNF cathode and 251.4, 210.0, 186.2, 150.3 F/g for the current densities of 0.5, 1, 2, and 5 A/g at 25° C., respectively. To evaluate the operability of the assembled ZIHSCs at cryogenic condition, their electrochemical properties were examined at −25° C., 0° C., and 25° C. FIG. 2C and FIG. 2D compared the GCD curves of A-CNF cathode- and N-CNF/ZIHSCs at different temperatures, respectively.

The comparison of the GCD curves at 2 A/g (FIG. 2C and FIG. 2D) clearly showed higher symmetry of the GCD curves and lower capacitance at a lower temperature. The effect of reducing temperature can be traced in FIG. 4E. As a structural energy storage, an extremely high energy density of 80.8 Wh/kg at the power density of 147.3 W/kg in the case of the N-CNF/ZIHSCs and a high energy density of 58.1 Wh/kg at the power density of 145.0 W/kg in the case of the A-CNF/ZIHSCs were obtained at 25° C. (FIG. 4F).

The combination of excellent properties, such as, for example, high specific surface area, transporting and storing ions in micro- and nano-sized channels, and excellent wettability are the main reasons for achieving such high electrochemical performance. FIG. 4F also shows a photograph of a N-CNF (3 mg)-included ZIHSC in a split-able test cell (EQ-HSTC split-able test cell) that was charged for only 30 seconds by a AA battery and used to power an electronic watch. The cycling stability of the as-prepared N-CNF/ZIHSCs was assessed at the current density of 10 A/g, as shown in FIG. 4G. After subjecting to 7500 charge/discharge cycles, the outstanding value of 94% of the initial specific capacitance was retained, demonstrating excellent electrochemical stability. Last charge-discharge cycles are provided as the inset in FIG. 4G.

The superior electrochemical performance of ZIHSC is due to a combination of factors, such as, but not limited to, high specific surface area, wettability, good electrical conductivity of CNFs, possessing small and large pores to transport and store ions, and combining faradic and capacitiveelectrodes.

The overall performance of the structural supercapacitors demands satisfactory load-bearing capabilities. The stress-strain curve (FIG. 3) was used to extract the relevant properties such as strength, modulus, and toughness. The obtained mechanical properties were excellent, and this multi-layered structure with very high toughness can make vehicles safer, for example.

As such, the present disclosure describes a technique for fabrication of structural ZLHSCs from the synthesis of electrodes to assembly, and how to use as body panels for a car in electronic devices. In this novel design of energy storage, both cathode and anode materials carry external loads and store energy. This knowledge is highly applicable in increasing the average distance an electric vehicle can go on a single charge, and in developing the next generation of efficient electric vehicles.

Unlike current supercapacitor designs that utilize yarn-like structures (e.g., yarn-like layout of carbon fibers), the supercapacitor of the present disclosure utilized unidirectional components (e.g., unidirectional carbon fibers) in a layered configuration. Additionally, the supercapacitors of the present disclosure can utilize asymmetric anodes and cathodes of different metals. These factors result in superior mechanical and energy storage properties, even at low temperatures, when compared to supercapacitors currently available.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A load-bearing supercapacitor comprising:
   a cathode material;
   a gel electrolyte; and
   a zinc foil anode,
   wherein the cathode material, the gel electrolyte, and the zinc foil anode are in a multilayered configuration, wherein the load-bearing supercapacitor comprises a yield strength of more than 300 MPa, a Young's modulus of more than 14 GPa, and a toughness value of more than 1.8 MJ/m$^3$.

2. The load-bearing supercapacitor of claim 1, wherein the cathode material is selected from the group consisting of carbon nanofiber or carbon fiber mats, carbon nanotube mats, free-standing graphene oxide film, free-standing nitrogen-doped graphene film, electrochemically-active polymers, carbon-based yarns, and combinations thereof.

3. The load-bearing supercapacitor of claim 1, wherein the cathode material is selected from the group consisting of unidirectional nitrogen-doped highly-porous carbon nanofibers (N-CNF), activated highly-porous CNF (A-CNF), and combinations thereof.

4. The load-bearing supercapacitor of claim 1, wherein the gel electrolyte is selected from the group consisting of an anti-freezing hydrogel, polyvinyl alcohol-water-ethylene glycol-Zn (CF$_3$SO$_3$)$_2$, polyvinylalcohol-water-ZnSO$_4$, polyvinyl alcohol-water-ZnCl$_2$, and combinations thereof.

5. The load-bearing supercapacitor of claim 1, wherein the gel electrolyte comprises polyvinyl alcohol (PVA) with a 60:40% solution of ethylene glycol (EG):water mixed in the presence of Zn $(CF_3SO_3)_2$.

6. The load-bearing supercapacitor of claim 1, wherein the gel electrolyte comprises a PVA/EG/water/Zn $(CF_3SO_3)_2$ electrolyte.

7. The load-bearing supercapacitor of claim 1, wherein the cathode material comprises A-CNF, and wherein the load-bearing capability comprises a maximum tensile strength in a range of 275 to 425 MPa, an average Young's modulus in a range of 10 to 20 GPa, and a toughness in a range of 1 to 2.25 $MJ/m^3$.

8. The load-bearing supercapacitor of claim 1, wherein the cathode material comprises N-CNF, and wherein the load-bearing capability comprises a maximum tensile strength in a range of 275 to 425 MPa, an average Young's modulus in a range of 10 to 20 GPa, and a toughness in a range of 1 to 2.25 $MJ/m^3$.

9. The load-bearing supercapacitor of claim 1, wherein the multilayered configuration comprises:
  a first zinc foil anode layer, a first gel electrolyte layer, and a first cathode material layer;
  a second gel electrolyte layer, a second zinc foil anode layer, and a second cathode material layer; and
  a third gel electrolyte layer and a third zinc foil anode layer.

10. The load-bearing supercapacitor of claim 1, wherein a panel of a car comprises the multilayered configuration.

11. A load-bearing supercapacitor comprising:
  a cathode material selected from the group consisting of unidirectional nitrogen-doped highly-porous carbon nanofibers (N-CNF), activated highly-porous CNF (A-CNF), and combinations thereof;
  a gel electrolyte comprising polyvinyl alcohol (PVA);
  a zinc foil anode;
  wherein the cathode material, the gel electrolyte, and the zinc foil anode are in a multilayered configuration; and
  wherein the load-bearing supercapacitor comprises a yield strength of more than 300 MPa, a Young's modulus of more than 14 GPa, and a toughness value of more than 1.8 $MJ/m^3$.

12. A method of making a load-bearing supercapacitor, the method comprising:
  fabricating a cathode material;
  preparing a gel electrolyte;
  coating a zinc foil electrode with the gel electrolyte;
  sandwiching the zinc foil electrode with the cathode material;
  wherein the sandwiching forms a multilayered configuration comprising the cathode material, the gel electrolyte, and the zinc foil anode; and
  wherein the load-bearing supercapacitor comprises a yield strength of more than 300 MPa, a Young's modulus of more than 14 GPa, and a toughness value of more than 1.8 $MJ/m^3$.

13. The method of claim 11, wherein the fabricating comprises:
  hot-drawing electrospun precursors; and
  applying an activation treatment.

14. The method of claim 12, wherein the method further comprises turbostratically aligning the cathode material after the hot-drawing.

15. The method of claim 11, wherein the cathode material is selected from the group consisting of carbon nanofiber or carbon fiber mats, carbon nanotube mats, free-standing graphene oxide film, free-standing nitrogen-doped graphene film, electrochemically-active polymers, carbon-based yarns, and combinations thereof.

16. The method of claim 11, wherein the cathode material is selected from the group consisting of unidirectional nitrogen-doped highly-porous carbon nanofibers (N-CNF), activated highly-porous CNF (A-CNF), and combinations thereof.

17. The method of claim 11, wherein the gel electrolyte is selected from the group consisting of an anti-freezing hydrogel, polyvinyl alcohol-water-ethylene glycol-Zn $(CF_3SO_3)_2$, polyvinylalcohol-water-$ZnSO_4$, polyvinyl alcohol-water-$ZnCl_2$, and combinations thereof.

18. The method of claim 11, wherein the gel electrolyte comprises polyvinyl alcohol (PVA) with a 60:40% solution of ethylene glycol (EG):water mixed in the presence of Zn $(CF_3SO_3)_2$.

19. The method of claim 11, wherein the gel electrolyte comprises a PVA/EG/water/Zn $(CF_3SO_3)_2$ electrolyte.

20. The method of claim 11, further comprising utilizing the multilayered configuration as a panel of a car.

* * * * *